(12) United States Patent
Du et al.

(10) Patent No.: US 12,710,519 B1
(45) Date of Patent: Aug. 18, 2026

(54) LIDAR SENSOR CALIBRATION VALIDATION USING VOXELIZED PLANAR APPROXIMATION OF POINT CLOUD

(71) Applicant: Zoox, Inc., Foster City, CA (US)

(72) Inventors: Chao Du, San Mateo, CA (US); Derek Adams, Pasadena, CA (US)

(73) Assignee: Zoox, Inc., Foster City, CA (US)

( * ) Notice: Subject to any disclaimer, the term of this patent is extended or adjusted under 35 U.S.C. 154(b) by 642 days.

(21) Appl. No.: 18/217,416

(22) Filed: Jun. 30, 2023

(51) Int. Cl.
*G01S 7/00* (2006.01)
*G01S 7/497* (2006.01)

(52) U.S. Cl.
CPC .................................. *G01S 7/4972* (2013.01)

(58) Field of Classification Search
CPC .... G01S 7/4972; G06V 10/759; G06V 10/26; G06T 2207/30252; G06T 19/20; G06T 7/11
USPC ........................................................ 356/4.01
See application file for complete search history.

(56) References Cited

U.S. PATENT DOCUMENTS

| | | | | |
|---|---|---|---|---|
| 10,649,459 | B2 | 5/2020 | Wang | |
| 10,983,199 | B2 * | 4/2021 | Adams | G01S 17/42 |
| 11,327,504 | B2 * | 5/2022 | Cao | G01C 21/206 |
| 2004/0023612 | A1 * | 2/2004 | Kriesel | G06V 20/64 452/157 |
| 2018/0232947 | A1 * | 8/2018 | Nehmadi | G01S 7/295 |
| 2018/0364717 | A1 * | 12/2018 | Douillard | G01S 17/931 |
| 2019/0003836 | A1 * | 1/2019 | Zhang | G01C 21/3848 |
| 2020/0043186 | A1 * | 2/2020 | Selviah | G06T 7/33 |
| 2020/0110158 | A1 * | 4/2020 | Ecins | G05D 1/024 |
| 2020/0327696 | A1 * | 10/2020 | Habib | G01S 17/86 |
| 2021/0142497 | A1 * | 5/2021 | Pugh | G06T 7/11 |
| 2021/0181758 | A1 | 6/2021 | Das | |
| 2021/0323572 | A1 * | 10/2021 | He | G06T 3/14 |
| 2021/0350147 | A1 * | 11/2021 | Yuan | G06F 18/23213 |
| 2021/0370968 | A1 * | 12/2021 | Xiao | G01C 21/3848 |
| 2022/0057201 | A1 * | 2/2022 | Adams | G01S 17/87 |
| 2022/0390607 | A1 * | 12/2022 | Du | G01S 17/89 |

OTHER PUBLICATIONS

U.S. Appl. No. 15/963,833, filed Apr. 26, 2018.
U.S. Appl. No. 16/779,576, filed Jan. 31, 2020.

* cited by examiner

*Primary Examiner* — Helal A Algahaim
*Assistant Examiner* — James W. Napier
(74) *Attorney, Agent, or Firm* — Lee & Hayes, P.C.

(57) ABSTRACT

Lidar sensor alignment validation may ensure that a relative position and/or orientation of two or more lidar sensors is accurate by determining a sensor alignment error associated with lidar data received from two or more lidar sensors. In some examples, the sensor alignment error may be determined based at least in part on a median angular error and/or median angle determined based at least in part on the lidar data. The median angular error and/or median angle may be determined based at least in part on a first distance from a first lidar point of a first lidar device to a first geometric approximation of a second lidar device's lidar data within a voxel and/or a second distance from a second lidar point of the second lidar device to a second geometric approximation of the first lidar device's lidar data within the voxel.

20 Claims, 7 Drawing Sheets

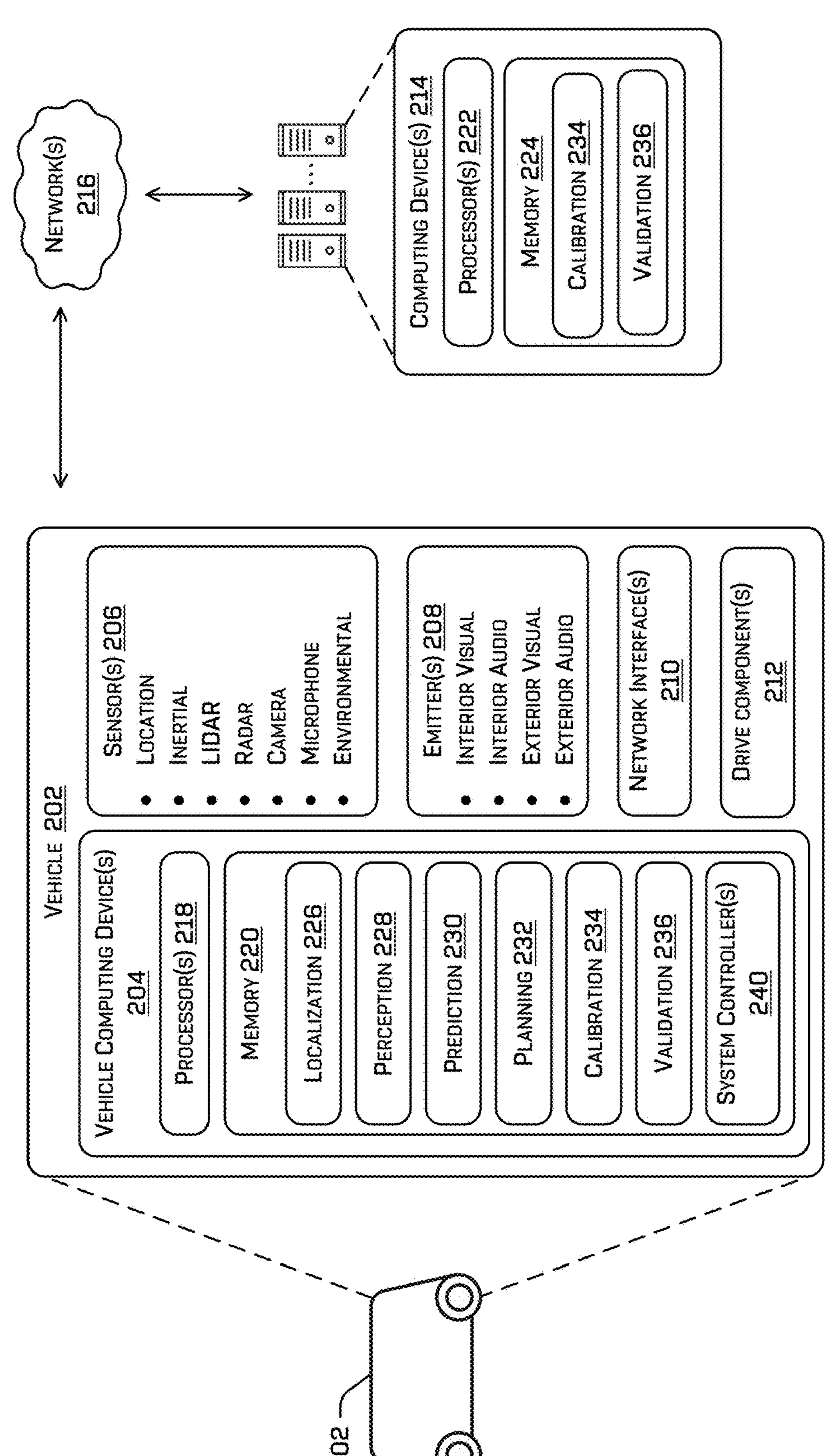
200
202
Vehicle 202
Vehicle Computing Device(s) 204
Processor(s) 218
Memory 220
Localization 226
Perception 228
Prediction 230
Planning 232
Calibration 234
Validation 236
System Controller(s) 240
Sensor(s) 206
Location
Inertial
LIDAR
Radar
Camera
Microphone
Environmental
Emitter(s) 208
Interior Visual
Interior Audio
Exterior Visual
Exterior Audio
Network Interface(s) 210
Drive Component(s) 212
Network(s) 216
Computing Device(s) 214
Processor(s) 222
Memory 224
Calibration 234
Validation 236
FIG. 2

LIDAR SENSOR CALIBRATION VALIDATION USING VOXELIZED PLANAR APPROXIMATION OF POINT CLOUD

BACKGROUND

Safety of passengers in a vehicle and other people or objects in proximity to autonomous or semi-autonomous vehicle is often predicated on accurate detection of locations of objects in the environment relative to the vehicle. To safely operate, an autonomous vehicle may include multiple sensors and various systems for detecting and tracking events surrounding the autonomous vehicle and may take these events into account when controlling the autonomous vehicle. These sensors must be calibrated properly to ensure that data they generate is usable by the autonomous vehicle to accurately detect what is happening in the environment and a miscalibration can cause a cascade of faults that may reduce the safety of operation of the autonomous vehicle.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIG. 2 illustrates a block diagram of an autonomous vehicle comprising a calibration component and sensor alignment validation component.

DETAILED DESCRIPTION

Figure 1:
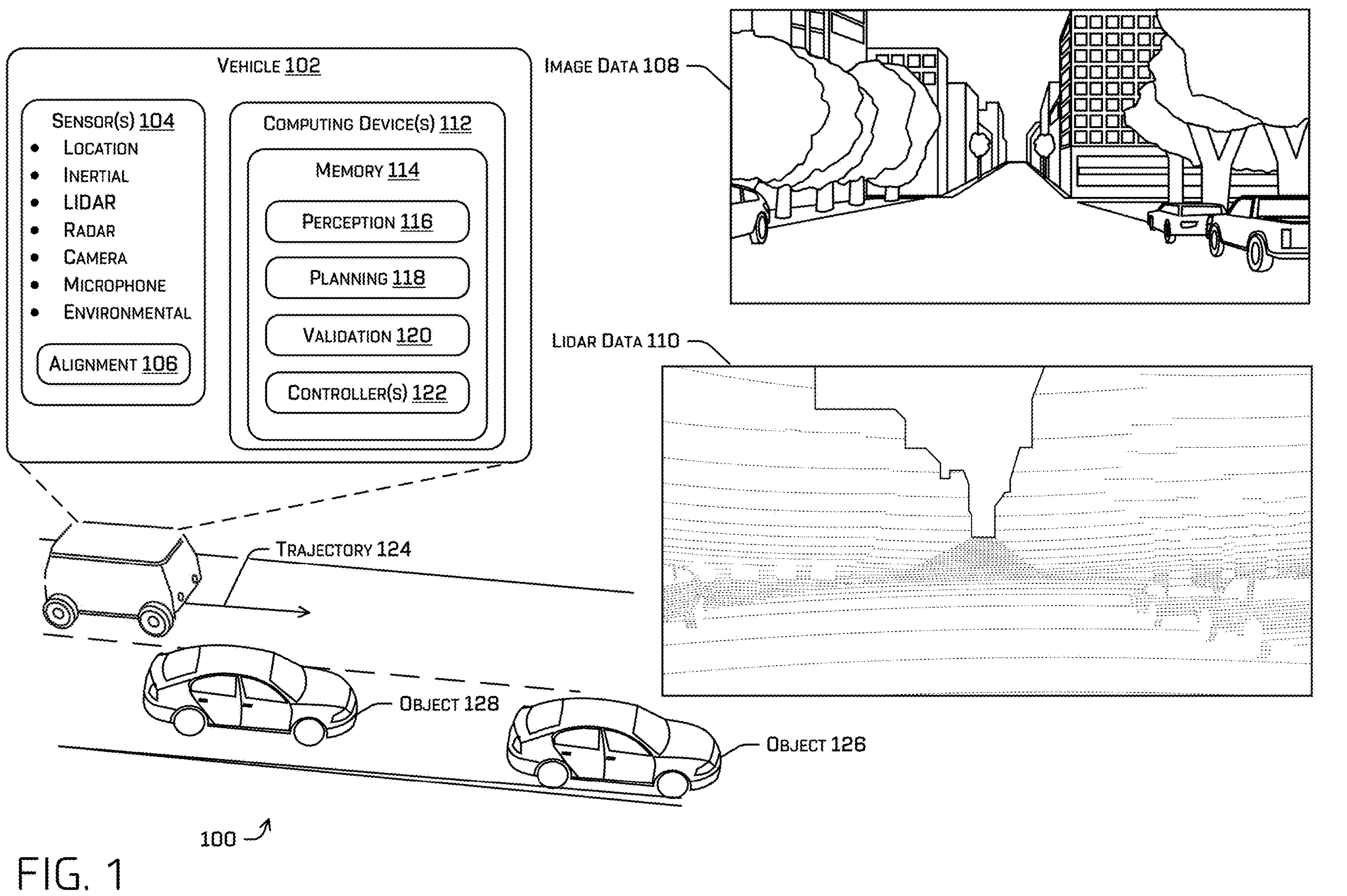
FIG. 1 illustrates an autonomous vehicle and an example scenario in which a lidar alignment is a part of determining operations of an autonomous vehicle.

As discussed above, an autonomous vehicle may include multiple sensors and various systems for detecting and tracking events surrounding the autonomous vehicle and may take these events into account when controlling the autonomous vehicle. These sensors must be calibrated properly to ensure that data they generate is usable by the autonomous vehicle to accurately detect what is happening in the environment, and a miscalibration can cause a cascade of faults that may reduce the safety of operation of the autonomous vehicle. In some examples, the calibration may determine extrinsic characteristics associated with a sensor's position and/or orientation relative to a common frame of reference, such as a frame of reference centered on the vehicle, a frame of reference centered on a particular sensor, and/or with reference to other sensors of the same sensor type. For example, a vehicle may include multiple lidar sensors and the calibration process may include determining a sensor position and/or orientation of one sensor relative to a vehicle frame of reference and/or other sensors' individual frames of references. This may be done to compensate for slight design deviations or flaws which may otherwise cause the actual position and orientation of a sensor, relative to the common frame of reference, to deviate from the position and orientation intended in the vehicle's design and the sensor placement. A successful completion of the calibration process may result in an alignment of the sensors such that sensor data from different sensors is collocated in a sensor space or is at least close enough to have an error below a threshold error.

Even though sensors may have already been calibrated, the calibration may not have been successful or calibration drift may occur. For example, large speed bumps, potholes, vehicle vibrations in the course of operating, and/or impact events, like hail, human-caused, or animal impacts with a sensor may cause the sensor alignment to no longer be accurate. Practically, this means that if a sensor was originally positioned and oriented in a particular manner and this position and orientation shifts suddenly or over time, the vehicle may continue to process sensor data from that sensor in a manner that is predicated on the original position and orientation of that sensor relative to the common frame of reference. This may cause a degradation in the accuracy of downstream systems, such as a perception component, planning component, and/or localization component of the vehicle, which may cause such components' outputs to be inaccurate or cause the components to be incapable of creating a usable output.

The techniques (e.g., hardware and/or software) described herein include a validation process that ensures that a lidar calibration achieves a satisfactory level of coherency and/or that no calibration drift has occurred. In some examples, the techniques may be used to detect when a re-calibration may be necessary and, if the sensor alignment is no longer valid (e.g., the alignment error discussed determined by the validation techniques discussed herein meets or exceeds a threshold), the validation component may trigger a re-calibration of the sensor alignment and/or cause the sensor alignment to be modified.

The techniques discussed herein may include receiving a current sensor alignment, which may indicate the relative positions and orientations of multiple lidar sensors associated with a vehicle. The current sensor alignment may be an initial sensor alignment or last iteration of a sensor alignment that is part of an iteration loop for modifying the sensor alignment to decrease the error associated with the sensor alignment. The techniques may include receiving log data comprising lidar data generated by different lidar devices. This lidar data may be converted to or represented as a point cloud, where an individual lidar point is associated with a location in an environment. Such a lidar point may additionally or alternatively indicate an intensity of a return associated with that lidar point.

In some examples, the techniques may include determining a voxelized representation of the point cloud. The voxelization of the point cloud may include dividing the space representing the environment into distinct voxels (discretized volumetric regions). In some examples, the voxels may have a same volume/dimensions or may vary in volume/dimensions based on a distance from the vehicle. In the latter example, a voxel further from the vehicle may be smaller than a voxel closer to the vehicle. As will be discussed further herein, this may allow distant lidar data to be represented using a plane when it might not be possible to reliably represent such data using a plane at a further distance from the vehicle, since the lidar data may get noisier as a function of distance from the vehicle.

The techniques may additionally or alternatively include identifying a subset of the voxels (i.e., a validation subset) as candidates for use in validating the sensor alignment and may include a preliminary filtering operation to exclude voxels from the validation subset that do not include sufficient lidar points. For example, a validation component may determine if the number of lidar points within a voxel meets or exceeds a threshold number and, if not, that voxel may be excluded from the validation subset. This may reduce storage and processing used for the validation process and may reduce the computational complexity and error outliers that may be caused by such voxels. A particular voxel may contain lidar data from multiple sensors.

The preliminary filtering operation may additionally or alternatively include determining whether sufficient lidar points from a particular lidar device are present in the voxel, otherwise the validation component may exclude that lidar device's lidar data from the validation operations discussed herein conducted for that voxel. For example, even if the voxel has a total number of lidar points that meets or exceeds a total lidar points threshold and therefore that voxel is included in the validation subset, the validation component may exclude a lidar device's lidar data from inclusion in the validation operations for that voxel if the number of lidar points associated with the particular lidar device is less than a second individual lidar points threshold.

In some examples, the preliminary filtering operation may additionally or alternatively include determining that a semantic classification associated with the voxel is invalid for validation purposes. A voxel associated with an invalid semantic classification may be excluded from the validation subset, in some examples. For example, the validation component may receive a semantic classification from a perception component of the autonomous vehicle. The semantic classification may be determined based on the lidar data or, in some examples, may additionally or alternatively based at least in part on other sensor data, such as image data, radar data, and/or the like. A semantic classification may indicate a classification of an object in the environment, such as "ground surface," "pedestrian," "vehicle," "foliage," "signage," "particular matter," (e.g., steam, fog, dust), and/or the like. Some whole classes of semantic classifications may be associated with objects that may have a low amount of planarity. For example, a bush or steam may cause the lidar returns associated with those objects to be highly variable and fitting a plane to those lidar points may be inaccurate. However, in some cases, choosing a small voxel size may allow a plane to accurately be fit to portions of such an object, such as a bush.

In some examples, the preliminary filtering operation may additionally or alternatively include determining a variance associated with the lidar data in a voxel. If the variance in position of the lidar data from an individual lidar device in a voxel meets or exceeds a threshold variance, the validation component may exclude the voxel from the validation subset. In some examples, determining the variance may include determining the variance of the lidar data in a direction orthogonal to the planar surface determined for that lidar data. The high variance of the positions of lidar points within a voxel may indicate that a plane may not accurately fit to the lidar points in that voxel.

For a voxel that has been at least preliminarily included in the validation subset, the validation component may determine a geometric approximation in association with each lidar data subset from different lidar devices associated with the voxel. For example, a voxel may contain a first subset of lidar data generated by a first lidar device and a second subset of lidar data generated by a second lidar device. The techniques may include determining a first geometric approximation associated with the first subset of lidar data from the first lidar device and a second geometric approximation associated with the second subset of lidar data from the second lidar device. In some examples, the geometric approximation may comprise a surface, such as a planar surface.

In some examples, the techniques may additionally or alternatively include determining whether a voxel and/or the contents thereof are suitable for inclusion in the validation subset. This additional or alternate filtering operation may include determining that two geometric approximations are not associated with a same feature in the environment and/or determining whether the lidar data in the voxel exhibits planarity, which may include determining that a planarity score satisfies a planarity requirement. For example, the planarity score may include a residual associated with fitting a plane to lidar data and satisfying the planarity requirement may include determining that the residual meets or exceeds a threshold residual. Additionally or alternatively, determining the planarity score may comprise determining an eigenvalue decomposition of lidar data from a particular sensor as part of principal component analysis (PCA) and/or singular value decomposition (SVD). In such an example, a PCA or SVD of a particular lidar sensor's lidar data may determine three sets of eigenvalues and/or singular values, which may be the values lying on the diagonal of a rectangular diagonal matrix determined as part of a decomposition in SVD and/or PCA, in three-dimensional space of the point cloud. In some examples, the eigenvalues and/or singular values may be normalized to account for any scaling effect. If the three singular values or eigenvalues are similar and larger than zero, the lidar data is non-planar. Whereas if two of the three singular values or eigenvalues are similar and greater than zero but the third value is zero or close to zero, the lidar data is planar. If two of the values are larger than zero but a second and third value are close to zero, the lidar data is a linear shape or a stick, which may be used or discarded. For example, shapes of lidar point cloud data with the eigenvalues (10, 10, 0) and (5, 5, 0) are planar. These values may be normalized by summing the first eigenvalues, resulting in 20, summing the second eigenvalues, and dividing the second sum by the first sum to give (10/20, 10/20, 0/20)=(0.5, 0.5, 0), which indicates a planar shape according to the rules discussed above. Note that similarity may be indicated by being a value within 0.1, 0.2, 0.3, or the like and close to zero may be indicated by being less than 0.2, 0.1, 0.05, 0.01 or the like.

If the geometric approximations are not associated with a same feature, the voxel may be excluded from the validation subset. If the geometric approximations appear to be fitting non-planar lidar data, such as when the residual for fitting a plane to a surface meets or exceeds the threshold residual, the voxel may be subdivided and new geometric approximations may be determined for a resultant sub-voxel of the vehicle for the lidar data contained therein. In some examples, this subdivision may occur up to a prespecified number of times. If subdivision has already occurred that number of times, the voxel may, instead, be excluded from the validation subset.

For a voxel that has passed this filtering, a distance may be determined between the geometric approximations therein. In some examples, this distance may be an average distance, a distance between centroids of the planes, or the like. In some examples, the distance may be a Euclidean distance or any other suitable distance. A total sensor alignment error may be determined by averaging the distances determined for the voxels in the validation subset. Additionally or alternatively, the multiple distances from the voxels in the validation subset may be converted into an angular error to account for the parallax effect due to various distances of the voxels from the vehicle. This angular error may be used as the total sensor alignment error.

If the sensor alignment error is below a threshold sensor alignment error, the current sensor alignment may be used as part of controlling a vehicle. For example, the vehicle may determine perception data based at least in part on the sensor alignment and this perception data may be used to determine an operation for controlling the vehicle. However, if the sensor alignment error is at or above the threshold sensor alignment error, the validation component may transmit a warning and/or may cause the sensor alignment to be altered to reduce the sensor alignment error. In some examples, altering the sensor alignment may be part of an iterative process for determining the sensor alignment. Altering the sensor alignment may comprise altering an indication of the relative position (translation compared to a frame of reference) and/or orientation of a lidar device relative to a common frame of reference such as a position and/or orientation of the vehicle and/or to the other lidar devices. In some examples, which sensor extrinsics are modified may be based at least in part on lidar data associated with a top k number of voxels, ranked by greatest error, and the sensor data associated therewith that was used in the validation process. This process may be iterated until the sensor alignment error is below the threshold sensor alignment error, at which time the modified sensor alignment may be used as part of controlling the vehicle.

The techniques discussed herein may increase the safety of operations of the vehicle by increasing the accuracy of the sensor data upon which perception data is generated. This, in turn, improves the accuracy and reliability of the perception data, which may be used by a planning component of the vehicle to determine an operation for controlling the vehicle. As such, the operation determined by the vehicle may be safer and more efficient for navigating the environment. Additionally or alternatively, the techniques discussed herein may reduce the storage and processing used for the validation technique discussed herein and may result in a decreasing the latency of the validation process. These storage, processing, and/or latency improvements may result from the filtering operations discussed herein and/or the filtering locations in the process flow.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be an aircraft, spacecraft, watercraft, and/or the like.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), odometry sensor (which may be determined based at least in part on inertial measurements and/or an odometer of the vehicle 102), a depth position sensor (e.g., a lidar sensor, a radar sensor, a sonar sensor, a time of flight (ToF) camera, a depth camera, an ultrasonic and/or sonar sensor), an image sensor (e.g., a visual light camera, infrared camera), an audio sensor (e.g., a microphone), and/or environmental sensor (e.g., a barometer, a hygrometer, etc.).

For those sensor modalities that include two or more sensors on the vehicle, such sensors may be associated with a sensor alignment 106 that identifies a relative position and/or orientation of each of the sensors of that modality type. For example, a relative position may identify a translation of a sensor relative to a common frame of reference, such as a vehicle frame of reference, and the orientation may identify an orientation of the sensor relative to the common frame of reference. This may be necessary, as sensors and/or the placement on the vehicle 102 may vary slightly from their design specifications and/or due to wear and tear, environmental conditions such as contraction and expansion due to weather conditions, and events such as impact events or on-vehicle vibration. Additionally or alternatively the sensor alignment 106 may identify a position and/or orientation of a sensor relative to a vehicle frame of reference. In at least one example, the sensor alignment 106 may identify a relative position and/or orientation of lidar devices mounted on or otherwise affixed to the vehicle 102.

The sensor(s) 104 may generate sensor data, which may include image data 108 of an environment surrounding the vehicle and/or lidar data 110. Image data 108 is provided to better comprehend the lidar data 110. Lidar data 110 may comprise light detection and ranging data generated by a respective lidar device of the vehicle 102. Light detection and ranging or "lidar" refers to a technique for measuring distances to surfaces by emitting light and measuring properties of the reflections of the light. A lidar device may include a light emitter and a light sensor. The light emitter may comprise a laser that directs light into an environment. When the emitted light is incident on a surface, a portion of the light is reflected and received by the light sensor, which converts light intensity to a corresponding electrical signal. A LIDAR device may include signal processing components that analyze reflected light signals to determine a distance to a surface from which the emitted laser light has been reflected. For example, the system may measure the propagation time of a light signal as it travels from the laser emitter, to the surface, and back to the light sensor. A distance is then calculated based on the flight time and the known speed of light. The relative position and/or orientation of the lidar sensor may then be used to determine where in the environment the surface is that reflected the light. This relative position and/or orientation is indicated by the sensor alignment 106. As such, the sensor alignment 106 will end up dictating where a lidar return or lidar point is determined to exist in the environment and changes to the sensor alignment 106 will change where it is estimated that this surface exists in the environment.

Computing device(s) 112 may comprise a memory 114 storing a perception component 116, a planning component 118, a validation component 120 that may carry out the techniques discussed herein, and/or controller(s) 122. In some examples, the perception component 116 may additionally or alternatively include a prediction component (unillustrated in FIG. 1 but illustrated in FIG. 2) and/or a simultaneous localization and mapping (SLAM) component (unillustrated in FIG. 1 but illustrated in FIG. 2), although either of these components may be their own separate component.

The validation component 120 may carry out the techniques described herein to validate and/or trigger modification to the sensor alignment 106 as discussed herein.

In general, the perception component 116 may determine what is in the environment surrounding the vehicle 102 and the planning component 118 may determine how to operate the vehicle 102 according to information received from the perception component 116. For example, the planning component 118 may determine trajectory 124 for controlling the vehicle 102 based at least in part on the perception data and/or other information such as, for example, one or more maps, prediction data, localization information (e.g., where the vehicle 102 is in the environment relative to a map and/or features detected by the perception component 116), and/or the like.

The trajectory 124 may comprise instructions for controller(s) 122 to actuate drive components of the vehicle 102 to effectuate a steering angle, steering rate, acceleration, and/or the like, which may result in a vehicle position, vehicle velocity, and/or vehicle acceleration. For example, the trajectory 124 may comprise a target heading, target steering angle, target steering rate, target position, target velocity, and/or target acceleration for the controller(s) 122 to track. In some examples, the trajectory 124 may be associated with controls sufficient to control the vehicle 102 over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters). In some examples, the controller(s) 122 may comprise software and/or hardware for actuating drive components of the vehicle 102 sufficient to track the trajectory 124. For example, the controller(s) 122 may comprise one or more proportional-integral-derivative (PID) controllers to control vehicle 102 to track trajectory 124.

FIG. 1 depicts an example of such a trajectory 124, represented as an arrow indicating a heading, velocity, and/or acceleration, although the trajectory itself may comprise instructions for a controller, which may, in turn, actuate a drive system of the vehicle 102. For example, the trajectory 124 may comprise instructions for controller(s) 122 of the vehicle 102 to actuate drive components of the vehicle 102 to effectuate a steering angle and/or steering rate, which may result in a vehicle position, vehicle velocity, and/or vehicle acceleration (or a simulated version thereof when the autonomous vehicle is being simulated). The trajectory 124 may comprise a target heading, target steering angle, target steering rate, target position, target velocity, and/or target acceleration for the controller(s) to track.

In some examples, the perception component 116 may receive sensor data from the sensor(s) 104 and determine data related to objects in the vicinity of the vehicle 102 (e.g., classifications associated with detected objects, instance segmentation(s), semantic segmentation(s) (e.g., identifying a portion of sensor data as being associated with a semantic classification), two and/or three-dimensional bounding boxes, tracks), route data that specifies a destination of the vehicle, global map data that identifies characteristics of roadways (e.g., features detectable in different sensor modalities useful for localizing the autonomous vehicle), a pose of the vehicle (e.g. position and/or orientation in the environment, which may be determined by or in coordination with a localization component), local map data that identifies characteristics detected in proximity to the vehicle (e.g., locations and/or dimensions of buildings, trees, fences, fire hydrants, stop signs, and any other feature detectable in various sensor modalities), etc.

In particular, the perception component 116 may determine, based at least in part on sensor data, an object detection indicating an association of a portion of sensor data with an object in the environment. The object detection may indicate an object classification, sensor data segmentation (e.g., mask, instance segmentation, semantic segmentation), a region of interest (ROI) identifying a portion of sensor data associated with the object, object classification, and/or a confidence score indicating a likelihood (e.g., posterior probability) that the object classification, ROI, pose (i.e., position and heading), velocity, acceleration, and/or sensor data segmentation is correct/accurate (there may be confidence score generated for each in some examples). For example, the ROI may include a portion of an image or radar data identified by an ML model or ML pipeline of the perception component 116 as being associated with the object, such as using a bounding box, mask, an instance segmentation, and/or a semantic segmentation. The object classifications determined by the perception component 116 may distinguish between different object types such as, for example, a passenger vehicle, a pedestrian, a bicyclist, a delivery truck, a semi-truck, traffic signage, and/or the like.

To give a concrete example, the vehicle 102 may receive sensor data including image data (from one or more image sensors) and/or other sensor data associated with the environment, such as lidar data, radar data, ToF data, and/or the like. The perception component may detect and classify objects in the environment using any of this sensor data or a combination thereof. For example, the perception component may detect dynamic objects, such as a cyclist, vehicle, pedestrian, or the like, and/or static objects, such as poles, traffic signage, general signage, a drivable surface, sidewalk, public furniture, building, etc. In the depicted example, the perception component 116 may determine, based at least in part on sensor data, an object detection associated with object 126, a vehicle, and another object detection associated with object 128

In some examples, the perception component 116 may additionally or alternatively determine a likelihood that a portion of the environment is occluded to one or more sensors and/or which particular sensor types of the vehicle. For example, a region may be occluded to a camera but not to radar or, in fog, a region may be occluded to the lidar sensors but not to cameras or radar to the same extent.

In some examples, any of this data determined by the perception component 116 may be indicated in a top-down representation of the environment. The top-down representation may comprise a data structure, such as a multi-channel image, where different channels of the image identify the existence, absence, or quality of a characteristic of the environment, as determined by the perception component based at least in part on sensor data received by the vehicle. For example, a portion of the top-down representation, such as a pixel, may indicate, depending on the channel of the image, the presence of an object at a location in the environment associated with that portion, an object classification of the object (e.g., one channel may indicate that presence or absence of a cyclist or a portion of a cyclist at a particular location in the environment), object heading, object velocity, map data (e.g., existence of a sidewalk, existence of and/or direction of travel associated with a roadway, signage location(s) and/or states, static object locations and/or classifications), and/or the like. Determining a top-down representation is discussed in more detail in U.S. Pat. No. 10,649,459, issued May 12, 2020, which is incorporated in its entirety herein for all purposes, and/or a top-down prediction associated with the environment, as described in more detail in U.S. patent application Ser. No. 16/779,576, filed Jan. 31, 2020, which is incorporated in its entirety herein for all purposes.

In some examples, object detections may be tracked over time. The perception component 116 and/or prediction component may determine a track to associate with an object. For example, a track may associate two object detections generated at two different times as being associated with a same object and may comprise a historical, current, and/or predicted object position, orientation, velocity, acceleration, and/or other state (e.g., door state, turning state, intent state such as signaling turn) of that object. The predicted portion of a track may be determined by the prediction component, in some examples.

The data produced by the perception component 116 may be collectively referred to as perception data. Once the perception component 116 has generated perception data, the perception component 116 may provide the perception data to a prediction component and/or the planning component 118. In an example where prediction data generated by the prediction component is used to generate a track, the perception component may also output such data to the planning component 118.

In some examples, the prediction component may receive sensor data and/or perception data and may determine a predicted state of dynamic objects in the environment. In some examples, dynamic objects may include objects that move or change states in some way, like traffic lights, moving bridges, train gates, and the like. The prediction component may use such data to a predict a future state, such as a signage state, position, orientation, velocity, acceleration, or the like, which collectively may be described as prediction data. For example, the prediction component may determine a prediction associated with vehicle object 128 indicating a predicted future position, orientation, velocity, acceleration, and/or state of object 128. In some examples, the prediction component may comprise a pipeline of hardware and/or software, which may include one or more GPU(s), ML model(s), Kalman filter(s), and/or the like.

The planning component 118 may use the perception data received from perception component 116 and/or prediction data received from the prediction component, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). The planning component 118 may use the perception data and/or prediction data to determine a route for the vehicle 102 from a first location to a second location; generate, substantially simultaneously and based at least in part on the perception data and/or simulated perception data (which may further include predictions regarding detected objects in such data), a plurality of candidate trajectories for controlling motion of the vehicle 102 in accordance with a receding horizon technique (e.g., 1 micro-second, half a second) to control the vehicle to traverse the route (e.g., in order to avoid any of the detected objects); and select one of the candidate trajectories as a trajectory 124 of the vehicle 102 that may be used to generate a drive control signal that may be transmitted to drive components of the vehicle 102.

The sensor data, perception data, prediction data, planning data, and/or any other computational outputs determined by component(s) of the vehicle 102 may be stored in association with the sensor data as log data. This log data may be transmitted to a remote computing device (unillustrated in FIG. 1 for clarity) for use in calibrating the sensors to determine the sensor alignment 106. Additionally or alternatively, the log data may comprise at least the sensor data and may be used for calibrating the sensors on the vehicle, as opposed to remotely.

Example System

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 112 and sensor(s) 206 may represent sensor(s) 104. The system 200 may additionally or alternatively comprise computing device(s) 214.

The sensor(s) 206 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 114. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), tensor processing units (TPUs), integrated circuits (e.g., application-specific integrated circuits (ASICs)), gate arrays (e.g., field-programmable gate arrays (FPGAs)), artificial intelligence (AI) hardware and/or accelerator (which may be any one or more of the previous processors or a stand-alone purpose designed chip) and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, prediction component 230, planning component 232, calibration component 234, validation component 236, and/or system controller(s) 240-zero or more portions of any of which may be hardware, such as GPU(s), CPU(s), TPU(s), FPGA(s), and/or other processing units. Perception component 228 may represent perception component 116, prediction component 230 may represent perception component, planning component 232 may represent planning component 118, validation component 236 may represent validation component 120, and controller(s) 240 may represent controller(s) 122.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data. In some examples, localization component 226 may provide, to the perception component 228 and/or prediction component 230, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. The perception component 228 may include a prediction component that predicts actions/states of dynamic components of the environment, such as moving objects, although the prediction component may be separate, as in the illustration. In some examples, the perception component 228 may determine a top-down representation of the environment that encodes the position(s), orientation(s), velocity(ies), acceleration(s), and/or other states of the objects in the environment. For example, the top-down representation may be an image with additional data embedded therein, such as where various pixel values encode the perception data discussed herein.

The prediction component 230 may predict a future state of an object in the environment surrounding the vehicle 202. For example, the future state may indicate a predicted object position, orientation, velocity, acceleration, and/or other state (e.g., door state, turning state, intent state such as signaling turn) of that object. Data determined by the prediction component 230 is referred to as prediction data. In some examples, the prediction component 230 may determine a top-down representation of a predicted future state of the environment. For example, the top-down representation may be an image with additional data embedded therein, such as where various pixel values encode the prediction data discussed herein.

The planning component 232 may receive a location and/or orientation of the vehicle 202 from the localization component 226 and/or perception data from the perception component 228 and may determine instructions for controlling operation of the vehicle 202 based at least in part on any of this data. In some examples, the memory 220 may further store map data, which is undepicted, and this map data may be retrieved by the planning component 232 as part of generating the environment state data discussed herein. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212)) that the drive component(s) 212 may parse/cause to be carried out, second instructions for the emitter(s) 208 may be formatted according to a second format associated therewith). In some examples, where the planning component 232 may comprise hardware/software-in-a-loop in a simulation (e.g., for testing and/or training the planning component 232), the planning component 232 may generate instructions which may be used to control a simulated vehicle. These instructions may additionally or alternatively be used to control motion of a real-world version of the vehicle 202, e.g., in instances where the vehicle 202 runs the simulation runs on vehicle during operation.

The calibration component 234 may determine an intrinsic calibration of a sensor, which may calibrate internal functions of the sensor to ensure the data generated thereby is accurate with reference to the sensor itself. Additionally or alternatively, the calibration component 234 may determine an extrinsic calibration of a group of sensors, resulting in the sensor alignment discussed herein. The extrinsic sensor alignment may identify a position and/or orientation of a sensor relative to a common frame of reference, such as a frame of reference centered on the vehicle and/or to the other sensors of the same modality. The calibration component 234 may comprise an optimization algorithm for iteratively improving the sensor alignment, which may be used in combination with the validation component 236 discussed herein. For example, the validation component 236 may be used to determine a measure of the quality of the sensor alignment, indicated as an error as discussed herein, and the calibration component 234 may modify the sensor alignment to reduce this error as part of iteratively determining the sensor alignment.

The validation component 236 may comprise software and/or hardware for validating a sensor alignment according to the techniques discussed herein. The validation component 236 may execute following an initial calibration of the vehicle's sensors. Additionally or alternatively, the validation component 236 may execute based at least in part on detecting an event, such as a passage of time since a last validation of the sensor alignment, receiving sensor data and/or perception data indicative of the occurrence of an event (e.g., IMU data associated with the vehicle as a whole or an individual sensor that indicates inertial movement above a threshold inertial movement; detection of an impact event with an individual sensor, a region of the vehicle including a sensor, or an impact with any area of the vehicle), and/or the like. In some examples, upon determining that the sensors are out of alignment, such as by determining the error determined as discussed herein meets or exceeds a threshold error, the validation component may trigger the calibration component 234 to modify the sensor alignment to realign the sensors. For vehicles that are actively operating, rather than merely being produced or tested, if upon iteratively using the calibration component 234 to modify the sensor alignment and the modified sensor alignment does not result in an alignment error below the alignment error threshold, the vehicle 202 may be caused to stop, transmit a request for assistance to a teleoperations device, or plan a route to a maintenance hub. In other examples where the sensor alignment is still valid, the validation component 236 may output an indication that the sensor alignment is valid, which may be used for auditing, and/or assurance that the vehicle 202 can continue to operate using the sensor alignment.

The memory 220 and/or 224 may additionally or alternatively store a mapping system, a planning system, a ride management system, simulation/prediction component, etc.

As described herein, the localization component 226, the perception component 228, the prediction component 230, the planning component 232, and/or other components of the system 200 may comprise one or more ML models. For example, localization component 226, the perception component 228, the prediction component 230, and/or the planning component 232 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, ROBERTa, XLNet, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) (which may be a portion of the drive component(s)), which may be configured to control steering, propulsion, braking, safety, emitters, communication, and other systems of the vehicle 202. These system controller(s) may communicate with and/or control corresponding systems of the drive component(s) 212 and/or other components of the vehicle 202. For example, the planning component 232 may generate instructions based at least in part on perception data generated by the perception component 228 and/or simulated perception data and transmit the instructions to the system controller(s), which may control operation of the vehicle 202 based at least in part on the instructions.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Relevance Filter Configuration

Figure 3:
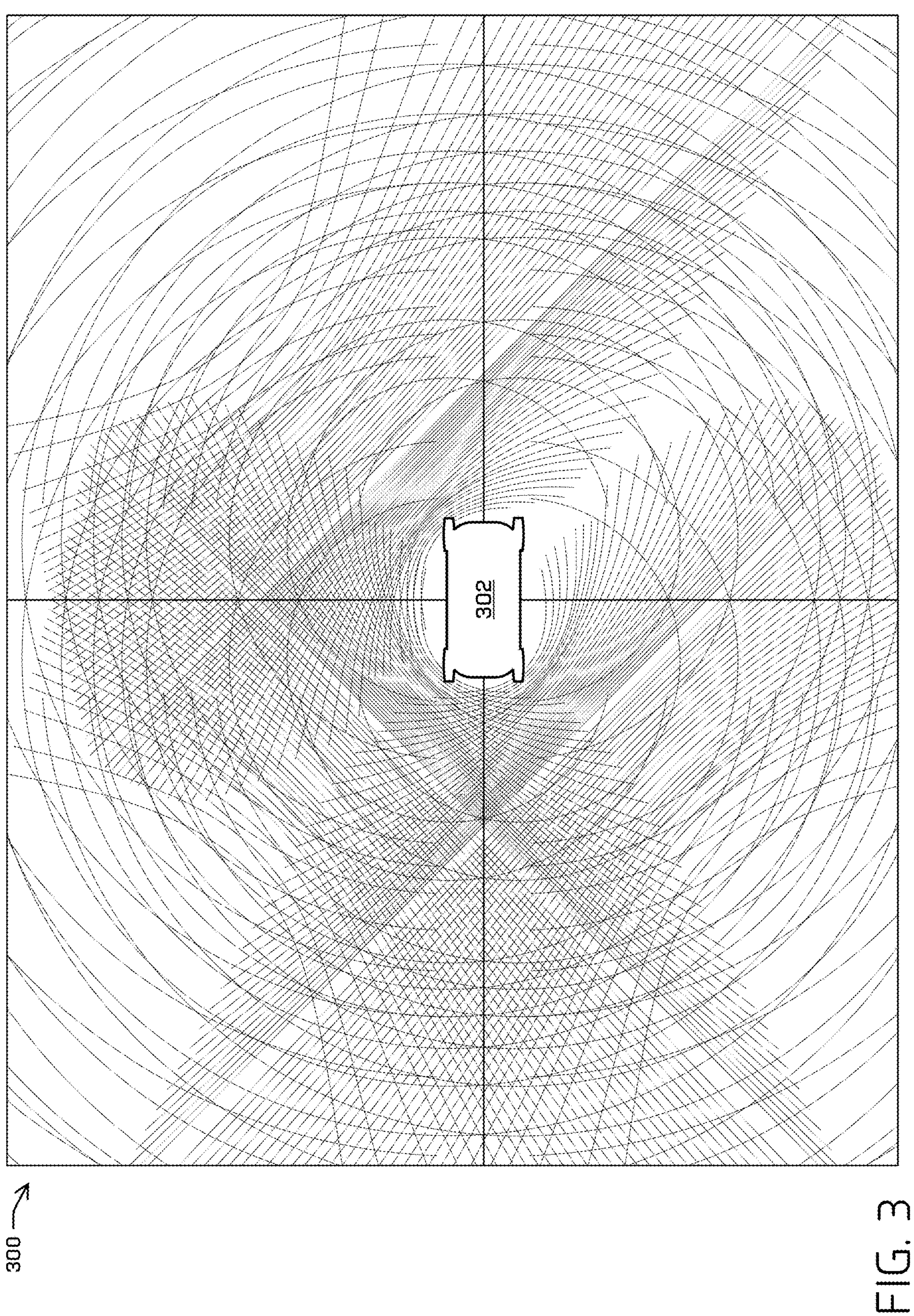
FIG. 3 illustrates a top-down view of point cloud coverage for a group of lidar sensors associated with a vehicle.

FIG. 3 illustrates a top-down view 300 of point cloud coverage for a group of eight lidar sensors mounted to a vehicle 302, illustrated at the center of the top-down view. The illustrated lines may depict scan lines of different lidar sensors of the vehicle and/or coverage achieved thereby and help illustrate the complexity of aligning these lidar sensors. The lidar coverage depicted may result from positioning two lidar sensors at each corner of the vehicle with one lidar sensor oriented upwards and a second lidar sensor oriented downwards.

Example Process to Determine a Relevance Score

FIGS. 4A-4D illustrate a pictorial flow diagram of an example process 400 for validating and/or modifying lidar sensor alignment. The operations in the process 400 may be used in combination, separately, and/or performed by the same device or different devices. For example, the operations can be implemented by a computing device of an autonomous vehicle 202 and/or a remote computing device (e.g., of a distributed computing service, of a teleoperations system). Hardware and/or software components of a vehicle computing system may be configured to accomplish at least part of the example process 400.

At operation 402, example process 400 may comprise receiving a current sensor alignment, according to any of the techniques discussed herein. The sensor alignment may identify the position and/or orientation of a sensor relative to a common frame of reference, such as a vehicle frame of reference, and/or relative to one or more sensors of the same type. In some examples, the sensor alignment may be associated with lidar devices of the vehicle and may indicate the relative positions and/or orientations of those lidar devices relative to each other and/or relative to common frame of reference. The current sensor alignment may be an initial sensor alignment or a most recent iteration of the sensor alignment as part of a iterative sensor alignment improvement process.

Figure 4A:
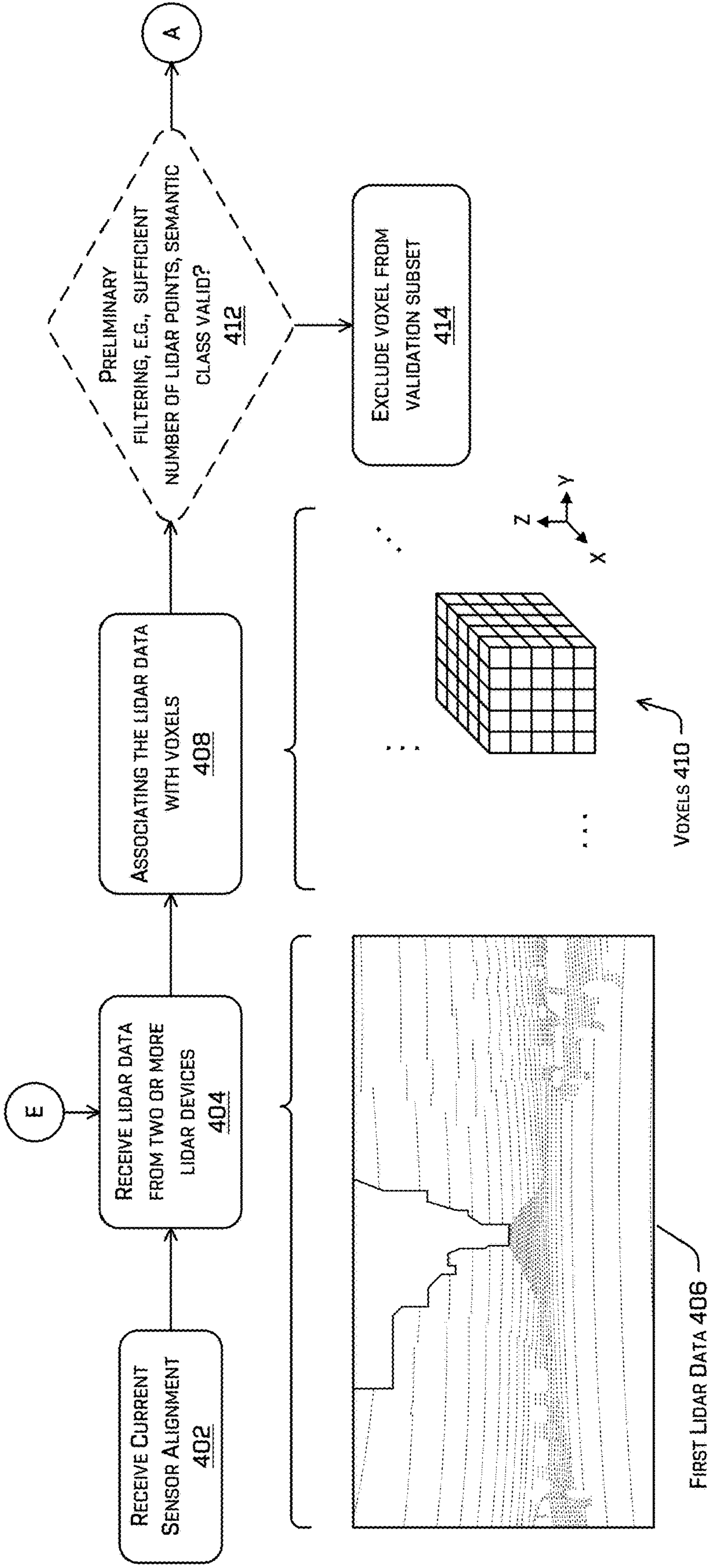
FIGS. 4A-4D illustrate a pictorial flow diagram of an example process for validating and/or modifying lidar sensor alignment.

At operation 404, example process 400 may comprise receiving lidar data from two or more lidar devices, according to any of the techniques discussed herein. Operation 404 may comprise receiving lidar data from up to all of the lidar devices associated with the vehicle but may include receiving lidar data from at least two lidar devices. The lidar data may identify which lidar device lidar data originated from. First lidar data may be received from a first lidar device and second lidar data may be received by a second lidar device. In some examples, the lidar data may be converted to a point cloud representation where an individual lidar point is associated with a location in three-dimensional space. FIG. 4A depicts an example three-dimensional representation of at least a portion of first lidar data 406 received from a first lidar device. Operation 404 may comprise receiving lidar data while the vehicle is stationary or moving. Additionally, or alternatively, operation 404 may comprise receiving lidar data from log data stored on the vehicle or retrievable by the vehicle via a network or receiving a most recently received set of lidar data from the lidar devices.

At operation 408, example process 400 may comprise associating the lidar data with voxels of a voxel space, according to any of the techniques discussed herein. Operation 408 may include converting a lidar data structure into a three-dimensional representation of the received lidar data, where the representation includes voxels. For example, points of a lidar point cloud may be associated with a voxel. A voxel may be considered, for simplicity, a three-dimensional pixel and may have dimensions associated therewith that define a volume. An individual voxel may thereby contain lidar data from one or more sensors, such as a subset of points from the point cloud. In some examples, an individual voxel may additionally or alternatively be associated with a particular portion of the environment. FIG. 4A depicts an example representation of a portion of the voxels, including voxels 410, any number of which may contain lidar data generated by the one or more lidar sensors. In some examples, a size of a voxel may be based at least in part on a distance from the vehicle that the voxel is. Voxels further from the vehicle may be smaller, whereas voxels closer to the vehicle may be larger. However, in some examples, the voxels may all be the same size.

At operation 412, example process 400 may comprise a preliminary filtering operation, according to any of the techniques discussed herein. In some examples, operation 412 may be optional. The example process 400 may include determining a subset of the voxels to use for the validation operations discussed herein and may exclude (at operation 414) one or more voxels from this validation subset. Voxel(s) not excluded by the preliminary filtering operation may be included in a preliminary validation subset at operation 416 (depicted in FIG. 4B). Voxel(s) excluded from the validation subset may not be suitable for the validation techniques because the operations may not be reasonably accurate for these voxel(s) or error(s) determined for these excluded voxel(s) would be non-representative of the true error. In some examples, the preliminary filtering operation may comprise excluding a voxel that does not contain a sufficient number of lidar points, is associated with an invalid semantic classification, and/or that contain lidar points having a variance in position greater than a threshold variance.

For example, a validation component may determine if the number of lidar points within a voxel meets or exceeds a threshold total number and, if not, that voxel may be excluded (at operation 414) from the validation subset. In some examples, operation 412 may additionally or alternatively comprise excluding lidar data received from a particular sensor from inclusion in a voxel, for purposes of the validation operations discussed herein, if a number of lidar points within the voxel received from that sensor do not meet or exceed a threshold number of individual sensor lidar points.

Additionally or alternatively, the validation component may exclude (at operation 414) lidar data in a voxel received from a particular sensor if the variance in position of the lidar points in a direction orthogonal to the planar surface associated with that sensor meets or exceeds a threshold variance. If no lidar data is left in the voxel after determining the variance was too high and/or the number of points for particular lidar device's data did not meet the threshold number, the voxel may be excluded from the validation subset.

Additionally or alternatively, the validation component may exclude (at operation 414) a voxel that contains lidar data with a planarity score below a planarity score threshold or a planarity score that does not satisfy a condition. For example, the validation component may determine the planarity score in association with lidar data from one or more lidar devices based at least in part on a curvature between lidar points and/or based at least in part on the variance of the positions of the lidar points in a direction orthogonal to the planar surface determined at operation 418 or orthogonal to a major axis of the positions of the lidar points. Additionally or alternatively, determining the planarity score may comprise determining an eigenvalue decomposition of lidar data from a particular sensor as part of principal component analysis (PCA) and/or singular value decomposition (SVD). In such an example, a PCA or SVD of a particular lidar sensor's lidar data may determine three sets of eigenvalues and/or singular values, which may be the values lying on the diagonal of a rectangular diagonal matrix determined as part of a decomposition in SVD and/or PCA, in three-dimensional space of the point cloud. In some examples, the eigenvalues and/or singular values may be normalized to account for any scaling effect.

If the three singular values or eigenvalues are similar and larger than zero, the lidar data is non-planar. Whereas if two of the three singular values or eigenvalues are similar and greater than zero but the third value is zero or close to zero, the lidar data is planar. If two of the values are larger than zero but a second and third value are close to zero, the lidar data is a linear shape or a stick, which may be used or discarded. For example, shapes of lidar point cloud data with the eigenvalues (10, 10, 0) and (5, 5, 0) are planar. These values may be normalized by summing the first eigenvalues, resulting in 20, summing the second eigenvalues, and dividing the second sum by the first sum to give (10/20, 10/20, 0/20)=(0.5, 0.5, 0), which indicates a planar shape according to the rules discussed above. Note that similarity may be indicated by being a value within 0.1, 0.2, 0.3, or the like and close to zero may be indicated by being less than 0.2, 0.1, 0.05, 0.01 or the like.

In some examples, the preliminary filtering operation may additionally or alternatively include determining that a semantic classification associated with the voxel is invalid for validation purposes. A voxel associated with an invalid semantic classification may be excluded (at operation 414) from the validation subset, in some examples. For example, the validation component may receive a semantic classification from a perception component of the autonomous vehicle. The semantic classification may be determined based on the lidar data or, in some examples, may additionally or alternatively based at least in part on other sensor data, such as image data, radar data, and/or the like. In some examples, the semantic classification may be determined by a perception component of the vehicle and associated with a portion of the lidar data via a semantic segmentation. A semantic classification may indicate a classification of an object in the environment, such as "ground surface," "pedestrian," "vehicle," "foliage," "signage," "particular matter," (e.g., steam, fog, dust), and/or the like. Some whole classes of semantic classifications may be associated with objects that may have a low amount of planarity. For example, a bush or steam may cause the lidar returns associated with those object to be highly variable and fitting a plane to those lidar points may be inaccurate. However, in some cases, choosing a small voxel size may allow a plane to accurately be fit to portions of such an object, such as a bush.

Figure 4B:
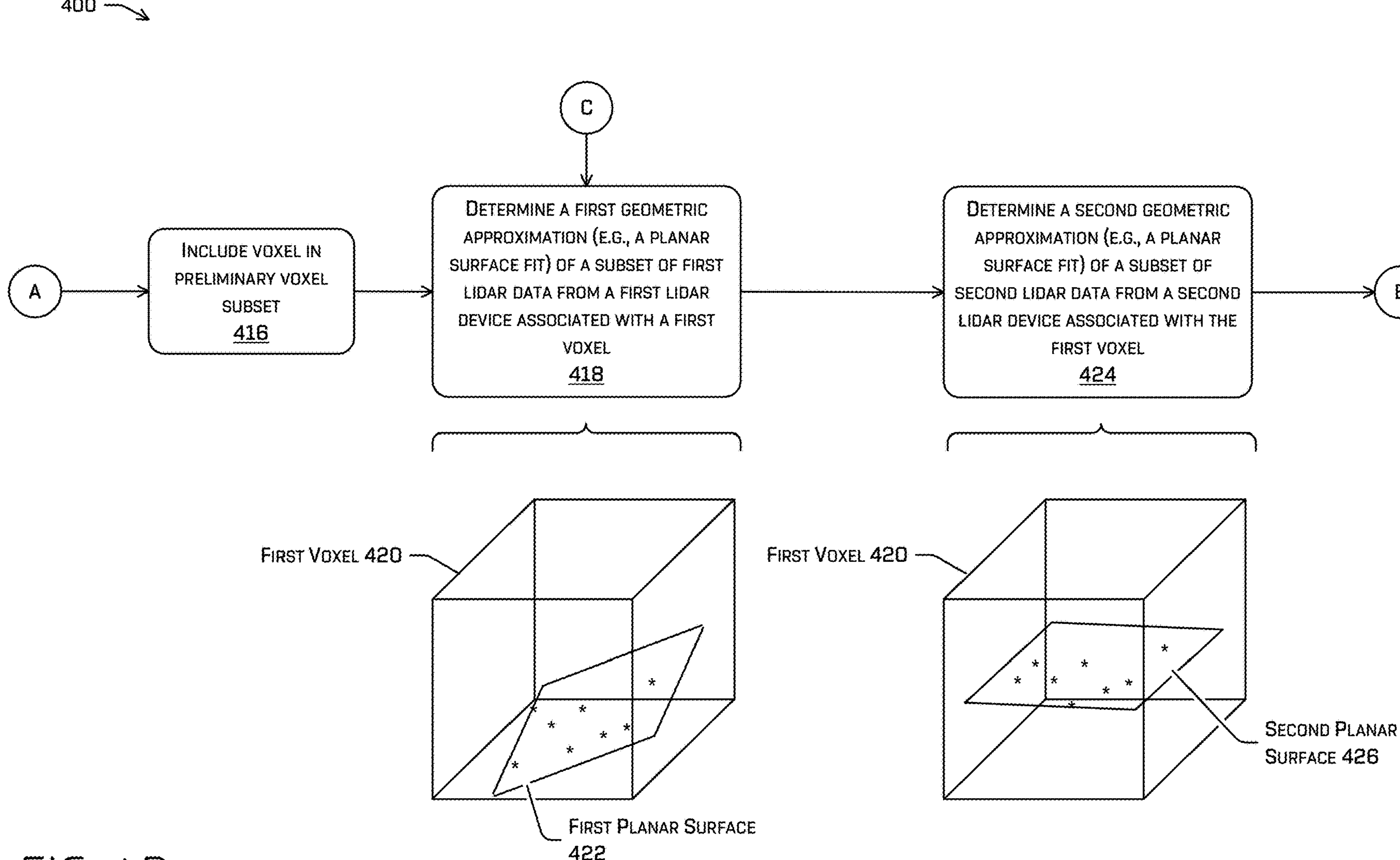

Turning to FIG. 4B, for those voxels not excluded by the preliminary filtering operation, at operation 416, example process 400 may comprise including the remaining voxels in a preliminary voxel subset. Voxels in this preliminary voxel subset may be processed at operation(s) 418 and/or 424.

At operation 418, example process 400 may comprise determining a first geometric approximation of a first subset of first lidar data received from a first lidar device associated with a first voxel, according to any of the techniques discussed herein. Operation 418 may include determining a first subset of lidar data contained within a first voxel 420 that was received from a first lidar device. FIG. 4B depicts an example of such as subset as stars within the first voxel 420. In some examples, operation 418 may comprise fitting the geometric approximation to the first subset of first lidar device data. The geometric approximation may include a planar surface, such as the planar surface 422 fit to the first subset of lidar data illustrated in FIG. 4B. Accordingly, operation 418 may comprise fitting a planar surface to the first subset of first lidar device data. In some examples, operation 418 may determine, as part of fitting the planar surface to the first subset a first residual that indicates how well (or how poorly) the first planar surface fits the first subset. In some examples, fitting the first planar surface to the first subset may using random sample consensus (RANSAC), a Hough transform, or any other suitable three-dimensional plane fitting algorithm to fit a first planar surface to the first subset.

Operation 418 may be repeated for up to all of the lidar data subsets received from one or more additional lidar devices that have lidar points in the first voxel 420 that have not been excluded by the preliminary filtering, such as when there aren't a sufficient number of lidar points from a particular lidar device within the first voxel 420; the variance of lidar point positions in a direction orthogonal to the planar surface associated with that sensor and/or curvature of the lidar points from a particular device within the first voxel 420 meet or exceed a threshold variance or threshold curvature, respectively; and/or the like. For illustration, at least a second geometric approximation is determined at operation 424 for a second subset of second lidar data received from a second lidar device that is contained by the first voxel 420.

At operation 424, example process 400 may comprise determining a second geometric approximation of a second subset of second lidar data received from a second lidar device associated with the first voxel, according to any of the techniques discussed herein. Operation 424 may include determining a second subset of lidar data contained within the first voxel 420 that was received from a second lidar device. FIG. 4B depicts an example of such as subset as stars within the first voxel 420. In some examples, operation 424 may comprise fitting the geometric approximation to the second subset of second lidar device data. The geometric approximation may include a planar surface, such as the planar surface 426 fit to the second subset of lidar data illustrated in FIG. 4B. Accordingly, operation 424 may comprise fitting a planar surface to the second subset of second lidar device data. In some examples, operation 424 may determine, as part of fitting the planar surface to the second subset a second residual that indicates how well (or how poorly) the second planar surface fits the second subset. In some examples, fitting the planar surface to the second subset may using RANSAC, a Hough transform, or any other suitable three-dimensional plane fitting algorithm to fit a second planar surface to the second subset. Additionally or alternatively, operations 418 and/or 424 may comprise a SVD, PCA, and/or eigen decomposition to determine the respective geometric approximation.

Figure 4C:
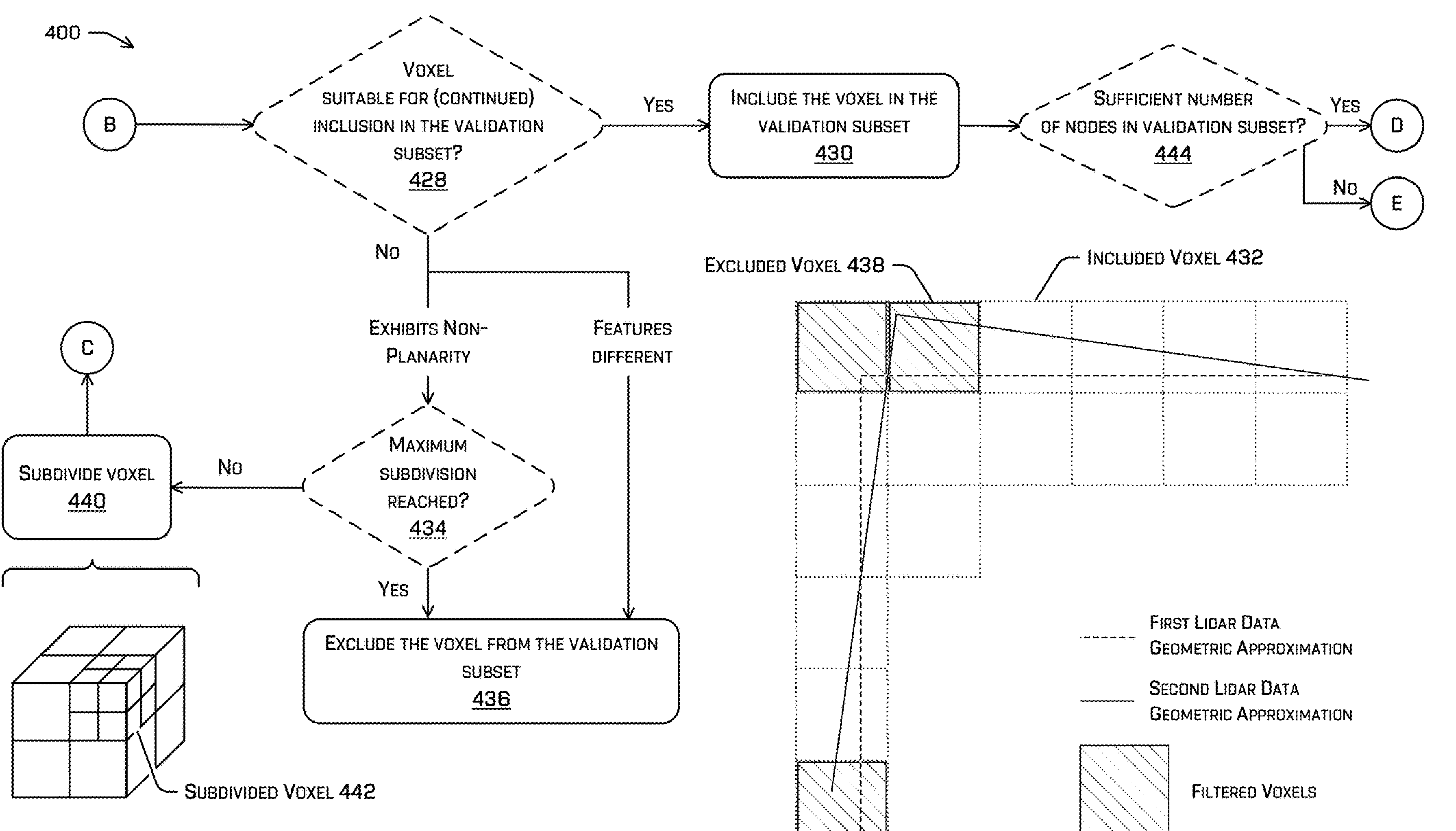

Turning to FIG. 4C, FIG. 4C includes an example two-dimensional representation of two geometric approximations generated for two different lidar device's respective lidar data subsets for a plurality of voxels, depicted as squares.

At operation 428, example process 400 may comprise an optional additional filtering operation to determine whether a voxel for which geometric approximations has been determined continues to appear to be suitable for inclusion in the validation subset, according to any of the techniques discussed herein. Operation 428 may comprise determining whether lidar data within the first voxel exhibits planarity, based at least in part on determining a planarity score associated with a particular lidar device's lidar data. Operation 428 may additionally or alternatively determine whether the geometric approximations are associated with a same feature of the environment. If the lidar data within a vehicle is planar and associated with a same feature of the environment, the voxel may be included in the validation subset at operation 430. For example, FIG. 4C depicts an example voxel that may be included in the validation subset, i.e., included voxel 432. Voxels without fill in FIG. 4C are voxels that are included in the validation subset, whereas hashed voxels have been excluded from the validation subset. For example, FIG. 4C depicts an example voxel that may be excluded from the validation subset, i.e., excluded voxel 438, which may be excluded for that voxel including geometric approximations that indicate different features.

Determining whether the features indicated by the geometric approximations for the first voxel are associated with a same feature may include determining that two lidar data sets from different sensors are associated with a same semantic label. Semantic labels may be associated with regions of lidar data or a lidar point itself as a result of a semantic segmentation executed by the perception system, which may be based at least in part on lidar data and/or other sensor data, see U.S. Patent Application Publication No. 2021/0181758, filed Jan. 31, 2020, the entirety of which is incorporated by reference herein for all purposes. However, if the lidar sets are associated with different semantic labels, the lidar sets may be indicated as being associated with different features. Additionally or alternatively, determining whether two geometric approximations are associated with a same feature may include comparing the planarity scores of the two lidar sets. For example, comparing the planarity scores may include determining whether the planarity scores for two lidar sets are within a threshold range of each other (for planarity scores that are based on residuals and/or variances) or determining whether eigenvalues determined for the lidar sets indicate a same type of surface (i.e., planar, non-planar, stick). If the geometric approximations are determined to be associated with different features in the environment, the voxel may be excluded from the validation subset at operation 436.

Determining whether the lidar data within the first voxel exhibits planarity may include determining a planarity score and determining whether the planarity score satisfies a condition. For example, determining the planarity score may comprise determining whether a residual associated with fitting a planar surface to a subset of lidar data within the first voxel meets or exceeds a threshold residual. A residual that meets or exceeds the threshold residual may indicate that a planar surface isn't suitable to model the subset of lidar data, i.e., the subset of lidar data may not be substantially planar. In an additional or alternate example, determining the planarity score may comprise determining a variance of the positions of lidar data points in a direction orthogonal to the planar surface determined for that lidar data. Operation 428 may determine that a set of lidar data within the voxel is non-planer if such a variance is greater than a variance threshold and planar if the variance is at or below the variance threshold.

Additionally or alternatively, determining the planarity score and/or determining whether the planarity score meets a condition may comprise determining an eigenvalue decomposition of lidar data from a particular sensor as part of principal component analysis (PCA) and/or singular value decomposition (SVD). In such an example, a PCA or SVD of a particular lidar sensor's lidar data may determine three sets of eigenvalues and/or singular values, which may be the values lying on the diagonal of a rectangular diagonal matrix determined as part of a decomposition in SVD and/or PCA, in three-dimensional space of the point cloud. In some examples, the eigenvalues and/or singular values may be normalized to account for any scaling effect. If the three singular values or eigenvalues are similar and larger than zero, the lidar data is non-planar. Whereas if two of the three singular values or eigenvalues are similar and greater than zero but the third value is zero or close to zero, the lidar data is planar. If two of the values are larger than zero but a second and third value are close to zero, the lidar data is a linear shape or a stick, which may be used or discarded. For example, shapes of lidar point cloud data with the eigenvalues (10, 10, 0) and (5, 5, 0) are planar. These values may be normalized by summing the first eigenvalues, resulting in 20, summing the second eigenvalues, and dividing the second sum by the first sum to give (10/20, 10/20, 0/20)=(0.5, 0.5, 0), which indicates a planar shape according to the rules discussed above. Note that similarity may be indicated by being a value within 0.1, 0.2, 0.3, or the like and close to zero may be indicated by being less than 0.2, 0.1, 0.05, 0.01 or the like.

If one or more sets of lidar data in the voxel that have a planarity score associated therewith that do not satisfy the respective condition (e.g., a residual that meets or exceeds the residual threshold, eigenvalues that indicate non-planarity), example process 400 may continue to operation 434 or the non-planar lidar data may be excluded at operation 436. So long as at least two lidar sensors' lidar data remains after any exclusions, the voxel may still be included in the validation subset at operation 430.

At operation 434, example process 400 may optionally comprise determining whether a maximum number of subdivisions for a particular voxel has been reached, according to any of the techniques discussed herein. For example, operation 434 may be reached after having previously subdivided a voxel into sub-voxels. A limit may be set on how many times a voxel (and its sub-voxels) may be subdivided. If this limit has been reached, the whole voxel may be excluded, including its sub-voxels, or only those sub-voxels for which the subdivision limit was reached may be excluded from the validation subset at operation 436.

If the subdivision limit has not been reached, if no limit exists, or if this is the first or only subdivision, example process 400 may continue to operation 440.

At operation 440, example process 400 may comprise determining a subdivision of the voxel into sub-voxels, according to any of the techniques discussed herein. For example, FIG. 4C depicts a subdivided voxel 442, which has been divided into four equal parts. In some examples, an octree may be used to identify sub-divided voxels and the parent voxel from which they were subdivided. Subdividing a voxel may allow lidar data that was formerly non-planar over a larger volume to be represented with a planar surface in a smaller volume. After subdividing the voxel, example process 400 may return to operation(s) 418 and/or 424 to determine new geometric approximations for the subsets of lidar data within up to each of the new sub-voxels. In some examples, example process 400 may return to operation 412 to re-conduct the preliminary filtering on a sub-voxel before returning to operation(s) 418 and/or 424 to ensure that the new sub-voxel contains sufficient lidar data, etc. A sub-voxel that passes the preliminary filtering and has geometric approximations generated for it may go back through the filtering at operation 428 and may be subsequently excluded from or included in the validation subset based on the filtering stemming from operation 428 discussed above.

For those voxels and/or sub-voxels that end up being included in the validation subset, example process 400 may continue to optional operation 444.

At operation 444, example process 400 may comprise determining a total number of voxels and/or sub-voxels present in the validation subset, according to any of the techniques discussed herein. In some examples, sub-voxels may be represented as a fraction of the root voxel from which they were determined. For example, depending on how the subdivision is conducted, a sub-voxel that resulted from a single subdivision of a voxel into four equal parts may be represented as 0.25 voxels and a sub-voxel that results from two subdivisions of a voxel into four equal parts may be represented as 0.125 voxels. Note that other subdivision schemes are contemplated, such as dividing a voxel in half.

If the total number of voxels in the validation subset meets or exceeds a threshold number of voxels, example process 400 may continue the validation process at operation 446. However, if the total number of voxels in the validation subset is less than the threshold number of voxels, example process 400 may return to operation 404 to receive a different or additional set of lidar data. In such an instance, not enough valid voxels remain after the filtering to ensure the integrity of the validation process and a new test set of lidar data may be retrieved. In some examples, the validation component may track how many times operation 444 has been reached in the example process 400 for a single validation attempt. If operation 444 has been reached a threshold number of times, instead of continuing to operation 446 or returning to operation 404, the validation component may output an error and may transmit a request for teleoperations assistance to a teleoperations device and/or transmit an indication to the planning component. The error indication transmitted to the planning component may cause the planning component to determine to pull over to a safe place, stop, and/or route to a maintenance hub so the vehicle can be examined.

Figure 4D:
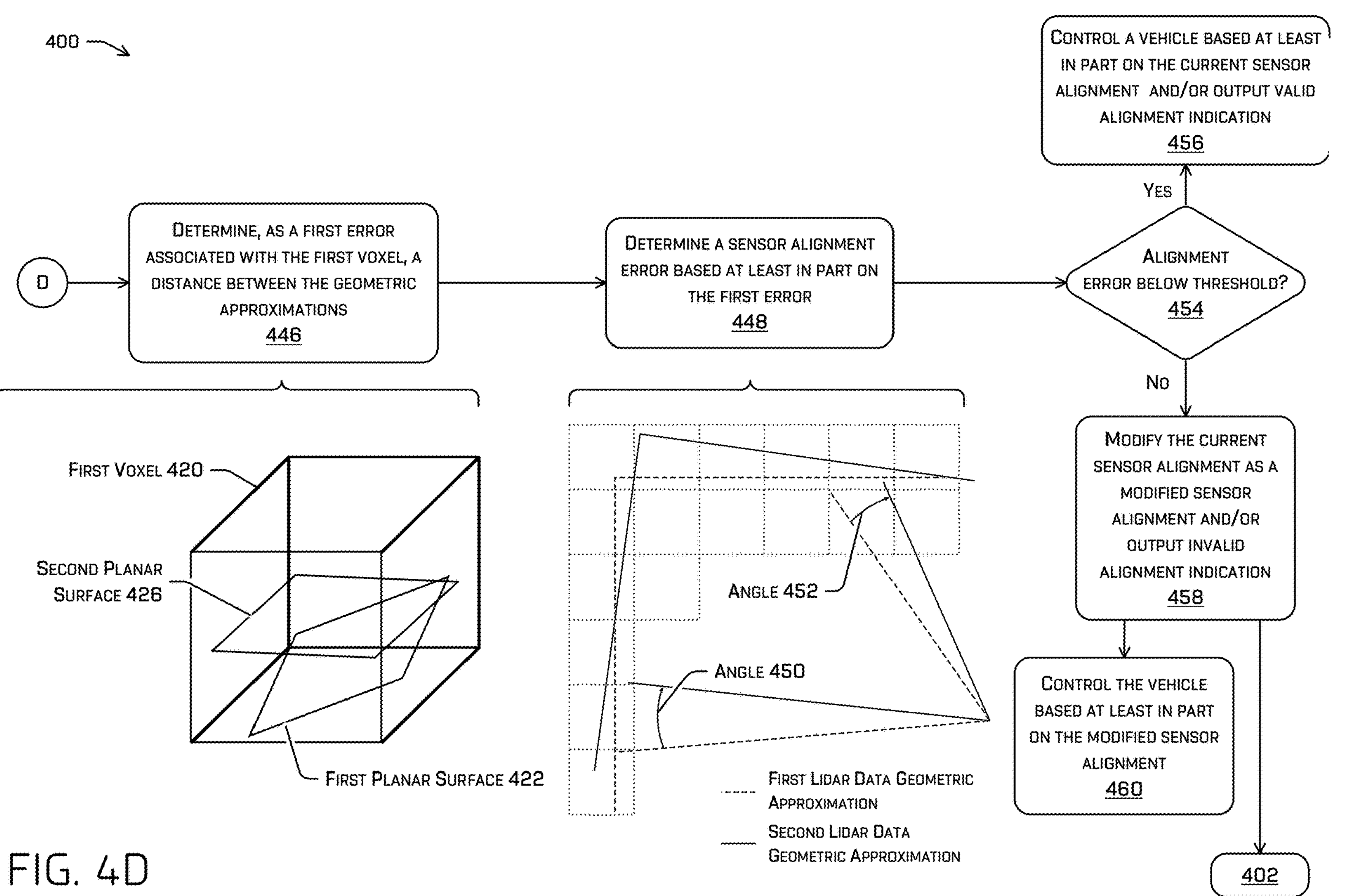

Turning to FIG. 4D, at operation 446, example process 400 may comprise determining, as a first error associated with the first voxel, a distance between the geometric approximations, according to any of the techniques discussed herein. To reach operation 446, the first voxel may have passed either or both of the filtering operations discussed herein. In some examples, operation 446 may be repeated for up to all of the voxels in the validation subset remaining after the filtering operation(s). Determining the distance between geometric approximations may include determining a first distance from a first lidar point in the subset of first lidar data to the second planar surface 426 and/or determining a second distance from a second lidar point in the subset of second lidar data to the first planar surface 422. For example, such a distance may be determined using a dot product. In some examples, first distances may be determined between up to all the lidar points in the subset of first lidar data to the second planar surface 426 and second distances may be determined between up to all the lidar points in the subset of first lidar data to the first planar surface 422. A distance between a point of a first lidar data subset to the planar surface associated with the second lidar data subset is referred to herein as a point-to-plane distance.

In an additional or alternate example, determining the distance between geometric approximations may comprise determining first sample point(s) across the first planar surface 422 and second sample point(s) across the second planar surface 426. The sample point(s) may include, for example, a centroid or medoid of a planar surface and, additionally or alternatively, a vertex of the planar surface, a point on an edge of the planar surface at a mid-point between two vertices, and/or other sample locations on the surface, which may be chosen randomly or according to a geometric shape, such as downscaled version of the planar surface. The same type of sample points is chosen for both surfaces and corresponding points are identified for use in the distance determination.

In an example where just a centroid or medoid of the surface is used as the sample point, the distance determined at operation 446 may include a distance between the first centroid/medoid of the first planar surface 422 and the second centroid/medoid of the second planar surface 426. The distance may be indicated in Euclidean space, spherical space, or any other suitable space. This distance is unillustrated because of the visual complexity caused by the addition of another line that may represent the distance between these points. In an example where multiple sample points are used, the distance determined at operation 446 may include an average distance. The average distance may be determined based at least in part on determining distances between corresponding sample points on the two planar surfaces, such as the distance between corresponding vertices, determining a dot product, and/or the like.

Regardless of how it is generated, the distance may represent an error in alignment of the lidar devices having lidar data associated with the first voxel 420 (that passed the filtering operations).

At operation 448, example process 400 may comprise determining a sensor alignment error based at least in part on the first error, according to any of the techniques discussed herein. Operation 448 may comprise determining a median point-to-plane distance from the point-to-plane distances of the lidar data in the voxel and converting the median point-to-plane distance to an angle 450. For example, determining the angle may comprise determining the arctangent of the median point-to-plane distance divided by the distance from the lidar sensor frustum or location to the voxel. Additionally, or alternatively, distances from all points from one lidar device in a voxel may be determined relative to a plane fit to points from the second lidar device in the voxel, as well as distances in the inverse (points from the second lidar to the plane of the first) and an average may be determined. This may be repeated for up to all of the voxels in the validation subset, such as angle 452, which may be determined for a different voxel than the voxel for which angle 450 was determined. Operation 448 may further comprise determining, based at least in part on the angles determined for at least two voxels, an angular error by determining a difference between the at least two angles. For example, angles 450 and 452 are different and the difference between these angles may be used as part of determining a median angular error, which may be based on the angle difference between up to all of the voxels in the validation subset. In an additional or alternate example, the sensor alignment error may instead or additionally include a median angle of up to all the angles determined for the voxels in the validation subset. Accordingly, the sensor alignment error may comprise the median angular difference and/or the median angle determined according to the discussion above.

At operation 454, example process 400 may comprise determining whether the sensor alignment error is below a threshold sensor alignment error, according to any of the techniques discussed herein. If the sensor alignment error is below the threshold sensor alignment error, such as by an average distance being less than a threshold average distance or an angular error being below a threshold angular error (e.g., threshold median angle or threshold median angular difference), example process 400 may continue to operation 456. If the sensor alignment error meets or exceeds the threshold sensor alignment error, example process 400 may continue to operation 458.

Additionally or alternatively, the example process 400 may output an indication that the sensor alignment has been validated (when the sensor alignment error is below the threshold sensor alignment error) or indicated to be invalid (when the sensor alignment error meets or exceeds the threshold sensor alignment error), which may be used for hardware and/or software bug hunting, incident investigation, tracking sensor alignment drift, and/or the like.

At operation 456, example process 400 may comprise controlling the vehicle based at least in part on the current sensor alignment, according to any of the techniques discussed herein. For example, the current sensor alignment may be used to generate a point cloud associated with the lidar data, which may include determining a location in the environment with which to associate a lidar point generated by a lidar device and/or a location of that lidar point in the point cloud relative to a different lidar point generated by a different lidar device. Both of these tasks are non-limiting examples of how the sensor alignment provides critical context for correct representation of the sensor data. In turn, this sensor data, once fused using the sensor alignment, may be used by other components of the vehicle for different tasks, such as determining perception data using the sensor data and/or planning a trajectory for the vehicle to follow based at least in part on the perception data.

At operation 458, example process 400 may comprise modifying the current sensor alignment as a modified sensor alignment, according to any of the techniques discussed herein. In some examples, operation 458 may comprise altering a position and/or orientation of a lidar device relative to a common frame of reference for all the lidar devices and/or relative to the position(s) and/or orientation(s) of the other lidar device(s). This may include altering the position and/or orientation of a lidar device in the extrinsic calibration data based at least in part on the sensor alignment error, such as an angular error. In some examples, operation 458 may comprise determining fitting a non-linear least squares to angles and/or the angle differences to determine the position(s) and/or orientation(s). Additionally or alternatively, the alteration may be based at least in part on one or more distances of a subgroup of voxels. For example, the subgroup of voxels may be those voxels in which lidar data from a specific lidar device was not filtered out and remained in the validation subset. Additionally or alternatively, the subgroup of voxels may be determined as the top m voxels by distances measured at operation 446. Example process 400 may return to operation 402 (as part of an iterative process to determine a final sensor alignment) or transition to operation 460 after operation 458.

At operation 458, example process 400 may comprise controlling the vehicle based at least in part on the modified sensor alignment, according to any of the techniques discussed herein.

EXAMPLE CLAUSES

A. A system comprising: one or more processors; and a non-transitory memory storing processor-executable instructions that, when executed by the one or more processors, cause the system to perform operations comprising: receiving a current sensor alignment identifying a first position and first orientation of a first lidar device associated with a vehicle relative to a second position and second orientation of a second lidar device; receiving, as a point cloud, first lidar data from the first lidar device and second lidar data from the second lidar device associated with an environment through which the vehicle is traversing; associating the point cloud with voxels, wherein a first voxel of the voxels is associated with a first portion of the environment; determining a first planar surface fit to lidar points of a first subset of the first lidar data associated with the first voxel; determining a second planar surface fit to lidar points of a second subset of the second lidar data associated with the first voxel; determining, as a first error associated with the first voxel, a first distance between a first lidar point of the first subset and the second planar surface; determining, as a second error associated with the first voxel, a second distance between a second lidar point of the second subset and the first planar surface; determining, based at least in part on the first error and the second error, a sensor alignment error associated with the current sensor alignment; and either: controlling the vehicle based at least in part on the current sensor alignment responsive to determining that the sensor alignment error is less than a threshold error; or modifying, as a modified sensor alignment, the current sensor alignment based at least in part on determining that the sensor alignment error meets or exceeds the threshold error; and controlling the vehicle based at least in part on the modified sensor alignment.

B. The system of paragraph A, wherein the operations further comprise determining a subset of voxels from among the voxels to include for validating the current sensor alignment, wherein the first voxel is determined to be included in the subset of voxels based at least in part on at least one of: determining that the first planar surface and the second planar surface are associated with a same feature of the environment, determining that a first planarity score determined for the first subset of the first lidar data indicates that the first subset is planar, determining that a number of lidar points in the first subset of the first lidar data meets or exceeds a threshold number of lidar points, or determining that the first subset of the first lidar data is associated with a determined semantic classification.

C. The system of paragraph B, wherein: determining the first planarity score comprises at least one of: determining a residual associated with fitting the first planar surface to the first subset of the first lidar data, determining a variance of position of lidar points in the first subset in a direction orthogonal to the first planar surface, or determining, by eigenvalue decomposition, eigenvalues associated with the first subset; and determining that the first subset is planar comprises: determining that the residual is less than a threshold residual, determining that the variance is less than a threshold variance, or determining that the eigenvalues include two eigenvalues that are positive or meet or exceed a first threshold number and a third eigenvalue that is zero or less than a second threshold number.

D. The system of either paragraph B or C, wherein: the first voxel is determined based at least in part on determining to subdivide a second voxel larger than and containing the first voxel; and the operations further comprise: determining a second planarity score associated with a third subset of the first lidar data associated with the second voxel; and determining that the second planarity score indicates that the third subset is non-planar, wherein determining to subdivide the second voxel is based at least in part on determining that the first second score indicates that the third subset is non-planar.

E. The system of any one of paragraphs A-D, wherein the operations further comprise determining a subset of voxels from among the voxels to include in a validation subset for validating the current sensor alignment, wherein: determining the subset of voxels comprises excluding a second voxel from the subset of voxels based at least in part on one or more of: determining that a third planar surface determined from a third subset of the first lidar data associated with the second voxel and a fourth planar surface determined from a fourth subset of the second lidar data associated with the second voxel are associated with different features in the environment, determining that a planarity score determined for the third subset of the first lidar data indicates that the third subset is nonplanar, determining that a number of lidar points in the third subset of the first lidar data is less than a threshold number of lidar points, or determining that the third subset of the first lidar data is associated with a semantic classification that is disallowed for validation.

F. The system of any one of paragraphs A-E, wherein determining the sensor alignment error comprises determining at least one of a total median angle or median angular error based at least in part on median angles determined for a subset of the voxels including the first voxel.

G. One or more non-transitory computer-readable media storing processor-executable instructions that, when executed by one or more processors, cause one or more processors to perform operations comprising: receiving a current sensor alignment of a first lidar device relative to a second lidar device; receiving first lidar data from the first lidar device and second lidar data from the second lidar device; associating the first lidar data and the second lidar data with voxels, wherein a first subset of the first lidar data is associated with a first voxel of the voxels and a second subset of the second lidar data is associated with the first voxel; determining, for a first voxel of the voxels, a first geometric approximation associated with the first subset of the first lidar data; determining, for the first voxel, a second geometric approximation associated with the second subset of the second lidar data; determining, as a first error associated with the first voxel, a first distance between a first lidar point of the first subset and the second geometric approximation; determining, as a second error associated with the first voxel, a second distance between a second lidar point of the second subset and the first geometric approximation; and based at least in part on a sensor alignment error that is based at least in part on the first error and the second error, either: determining to output a validation of the current sensor alignment based at least in part on determining that the sensor alignment error is less than an error threshold, or determining to output an indication that the current sensor alignment is invalid based at least in part on determining that the sensor alignment error meets or exceeds the error threshold.

H. The one or more non-transitory computer-readable media of paragraph G, wherein the operations further comprise determining a subset of voxels from among the voxels to include for validating the current sensor alignment, wherein the first voxel is determined to be included in the subset of voxels based at least in part on at least one of: determining that the first geometric approximation and the second geometric approximation are associated with a same feature of an environment through which a vehicle is traversing, determining that a first planarity score determined for the first subset of the first lidar data indicates that the first subset is planar, determining that a number of lidar points in the first subset of the first lidar data meets or exceeds a threshold number of lidar points, or determining that the first subset of the first lidar data is associated with a determined semantic classification.

I. The one or more non-transitory computer-readable media of paragraph H, wherein: determining the first planarity score comprises at least one of: determining a residual associated with fitting the first geometric approximation to the first subset of the first lidar data, determining a variance of position of lidar points in the first subset in a direction orthogonal to the first geometric approximation, or determining, by eigenvalue decomposition, eigenvalues associated with the first subset; and determining that the first subset is planar comprises: determining that the residual is less than a threshold residual, determining that the variance is less than a threshold variance, or determining that the eigenvalues include two eigenvalues that are positive or meet or exceed a first threshold number and a third eigenvalue that is zero or less than a second threshold number.

J. The one or more non-transitory computer-readable media of either paragraph H or I, wherein: the first voxel is determined based at least in part on determining to subdivide a second voxel larger than and containing the first voxel; and the operations further comprise: determining a second planarity score associated with a third subset of the first lidar data associated with the second voxel; and determining that the second planarity score indicates that the third subset is non-planar, wherein determining to subdivide the second voxel is based at least in part on determining that the first second score indicates that the third subset is non-planar.

K. The one or more non-transitory computer-readable media of any one of paragraphs G-J, wherein the operations further comprise determining a subset of voxels from among the voxels to include in a validation subset for validating the current sensor alignment, wherein: determining the subset of voxels comprises excluding a second voxel from the subset of voxels based at least in part on one or more of: determining that a third geometric approximation determined from a third subset of the first lidar data associated with the second voxel and a fourth geometric approximation determined from a fourth subset of the second lidar data associated with the second voxel are associated with different features in an environment through which a vehicle is traversing, determining that a planarity score determined for the third subset of the first lidar data indicates that the third subset is nonplanar, determining that a number of lidar points in the third subset of the first lidar data is less than a threshold number of lidar points, or determining that the third subset of the first lidar data is associated with a semantic classification that is disallowed for validation.

L. The one or more non-transitory computer-readable media of any one of paragraphs G-K, wherein determining the sensor alignment error comprises determining at least one of a total median angle or median angular error based at least in part on median angles determined for a subset of the voxels including the first voxel.

M. The one or more non-transitory computer-readable media of paragraph L, wherein determining at least one of the total median angle or the median angular error is based at least in part: determining a first angle based at least in part on the first distance and a first distance from the first lidar device to the first voxel; determining a second angle based at least in part on the second distance and a second distance from the second lidar device to the first voxel; determining a first median angle based at least in part on the first angle and the second angle; and at least one of determining the total median angle based at least in part on the first median angle and other median angles associated with other voxels of the subset of the voxels or determining the median angular error based at least in part on a difference between the first median angle and the other median angles.

N. The one or more non-transitory computer-readable media of any one of paragraphs G-M, wherein: the operations comprise modifying the current sensor alignment as a modified sensor alignment based at least in part on determining the indication that the current sensor alignment is invalid; and modifying the current sensor alignment comprises altering at least one of a first position of the first lidar device, a first orientation of the first lidar device, a second position of the second lidar device, or a second orientation of the second lidar device to reduce to the sensor alignment error.

O. A method comprising: receiving a current sensor alignment of a first lidar device relative to a second lidar device; receiving first lidar data from the first lidar device and second lidar data from the second lidar device; associating the first lidar data and the second lidar data with voxels, wherein a first subset of the first lidar data is associated with a first voxel of the voxels and a second subset of the second lidar data is associated with the first voxel; determining, for a first voxel of the voxels, a first geometric approximation associated with the first subset of the first lidar data; determining, for the first voxel, a second geometric approximation associated with the second subset of the second lidar data; determining, as a first error associated with the first voxel, a first distance between a first lidar point of the first subset and the second geometric approximation; determining, as a second error associated with the first voxel, a second distance between a second lidar point of the second subset and the first geometric approximation; and based at least in part on a sensor alignment error that is based at least in part on the first error and the second error, either: determining to output a validation of the current sensor alignment based at least in part on determining that the sensor alignment error is less than an error threshold, or determining to output an indication that the current sensor alignment is invalid based at least in part on determining that the sensor alignment error meets or exceeds the error threshold.

P. The method of paragraph O, wherein the method further comprises determining a subset of voxels from among the voxels to include for validating the current sensor alignment, wherein the first voxel is determined to be included in the subset of voxels based at least in part on at least one of: determining that the first geometric approximation and the second geometric approximation are associated with a same feature of an environment through which a vehicle is traversing, determining that a first planarity score determined for the first subset of the first lidar data indicates that the first subset is planar, determining that a number of lidar points in the first subset of the first lidar data meets or exceeds a threshold number of lidar points, or determining that the first subset of the first lidar data is associated with a determined semantic classification.

Q. The method of paragraph P, wherein: determining the first planarity score comprises at least one of: determining a residual associated with fitting the first geometric approximation to the first subset of the first lidar data, determining a variance of position of lidar points in the first subset in a direction orthogonal to the first geometric approximation, or determining, by eigenvalue decomposition, eigenvalues associated with the first subset; and determining that the first subset is planar comprises: determining that the residual is less than a threshold residual, determining that the variance is less than a threshold variance, or determining that the eigenvalues include two eigenvalues that are positive or meet or exceed a first threshold number and a third eigenvalue that is zero or less than a second threshold number.

R. The method of any one of paragraphs O-Q, wherein the method further comprises determining a subset of voxels from among the voxels to include in a validation subset for validating the current sensor alignment, wherein: determining the subset of voxels comprises excluding a second voxel from the subset of voxels based at least in part on one or more of: determining that a third geometric approximation determined from a third subset of the first lidar data associated with the second voxel and a fourth geometric approximation determined from a fourth subset of the second lidar data associated with the second voxel are associated with different features in an environment through which a vehicle is traversing, determining that a planarity score determined for the third subset of the first lidar data indicates that the third subset is nonplanar, determining that a number of lidar points in the third subset of the first lidar data is less than a threshold number of lidar points, or determining that the third subset of the first lidar data is associated with a semantic classification that is disallowed for validation.

S. The method of any one of paragraphs O-R, wherein determining the sensor alignment error comprises determining at least one of a total median angle or median angular error based at least in part on median angles determined for a subset of the voxels including the first voxel.

T. The method of paragraph S, wherein determining at least one of the total median angle or the median angular error is based at least in part: determining a first angle based at least in part on the first distance and a first distance from the first lidar device to the first voxel; determining a second angle based at least in part on the second distance and a second distance from the second lidar device to the first voxel; determining a first median angle based at least in part on the first angle and the second angle; and at least one of determining the total median angle based at least in part on the first median angle and other median angles associated with other voxels of the subset of the voxels or determining the median angular error based at least in part on a difference between the first median angle and the other median angles.

U. A system comprising one or more processors and non-transitory memory storing processor-executable instructions that, when executed by the one or more processors, cause the processors to perform operations comprising the method of any one of paragraphs O-T.

V. One or more non-transitory computer-readable media storing processor-executable instructions that, when executed by the one or more processors, cause the processors to perform operations comprising the method of any one of paragraphs O-T.

W. An autonomous vehicle comprising the system of any one of paragraphs A-F.

X. An autonomous vehicle comprising the one or more non-transitory computer-readable media of any one of paragraphs G-N.

Y. An autonomous vehicle comprising one or more processors and non-transitory memory storing processor-executable instructions that, when executed by the one or more processors, cause the processors to perform operations comprising the method of any one of paragraphs O-T.

While the example clauses described above are described with respect to one particular implementation, it should be understood that, in the context of this document, the content of the example clauses can also be implemented via a method, device, system, computer-readable medium, and/or another implementation. Additionally, any of examples A-Y may be implemented alone or in combination with any other one or more of the examples A-Y.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to indicate that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a," "an" or other similar articles means singular and/or plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and a non-transitory memory storing processor-executable instructions that, when executed by the one or more processors, cause the system to perform operations comprising:

receiving a current sensor alignment identifying a first position and first orientation of a first lidar device associated with a vehicle relative to a second position and second orientation of a second lidar device;

receiving, as a point cloud, first lidar data from the first lidar device and second lidar data from the second lidar device associated with an environment through which the vehicle is traversing;

associating the point cloud with voxels, wherein a first voxel of the voxels is associated with a first portion of the environment;

determining a first planar surface fit to lidar points of a first subset of the first lidar data associated with the first voxel;

determining a second planar surface fit to lidar points of a second subset of the second lidar data associated with the first voxel;

determining, as a first error associated with the first voxel, a first distance between a first lidar point of the first subset and the second planar surface;

determining, as a second error associated with the first voxel, a second distance between a second lidar point of the second subset and the first planar surface;

determining, based at least in part on the first error and the second error, a sensor alignment error associated with the current sensor alignment; and either:

controlling the vehicle based at least in part on the current sensor alignment responsive to determining that the sensor alignment error is less than a threshold error; or modifying, as a modified sensor alignment, the current sensor alignment based at least in part on determining that the sensor alignment error meets or exceeds the threshold error; and controlling the vehicle based at least in part on the modified sensor alignment.

2. The system of claim 1, wherein the operations further comprise determining a subset of voxels from among the voxels to include for validating the current sensor alignment, wherein the first voxel is determined to be included in the subset of voxels based at least in part on at least one of:

determining that the first planar surface and the second planar surface are associated with a same feature of the environment, determining that a first planarity score determined for the first subset of the first lidar data indicates that the first subset is planar, determining that a number of lidar points in the first subset of the first lidar data meets or exceeds a threshold number of lidar points, or determining that the first subset of the first lidar data is associated with a determined semantic classification.

3. The system of claim 2, wherein:

determining the first planarity score comprises at least one of:

determining a residual associated with fitting the first planar surface to the first subset of the first lidar data, determining a variance of position of lidar points in the first subset in a direction orthogonal to the first planar surface, or determining, by eigenvalue decomposition, eigenvalues associated with the first subset; and determining that the first subset is planar comprises:

determining that the residual is less than a threshold residual, determining that the variance is less than a threshold variance, or determining that the eigenvalues include two eigenvalues that are positive or meet or exceed a first threshold number and a third eigenvalue that is zero or less than a second threshold number.

4. The system of claim 2, wherein:

the first voxel is determined based at least in part on determining to subdivide a second voxel larger than and containing the first voxel; and the operations further comprise:

determining a second planarity score associated with a third subset of the first lidar data associated with the second voxel; and determining that the second planarity score indicates that the third subset is non-planar, wherein determining to subdivide the second voxel is based at least in part on determining that the first second score indicates that the third subset is non-planar.

5. The system of claim 1, wherein the operations further comprise determining a subset of voxels from among the voxels to include in a validation subset for validating the current sensor alignment, wherein:

determining the subset of voxels comprises excluding a second voxel from the subset of voxels based at least in part on one or more of:

determining that a third planar surface determined from a third subset of the first lidar data associated with the second voxel and a fourth planar surface determined from a fourth subset of the second lidar data associated with the second voxel are associated with different features in the environment, determining that a planarity score determined for the third subset of the first lidar data indicates that the third subset is nonplanar, determining that a number of lidar points in the third subset of the first lidar data is less than a threshold number of lidar points, or determining that the third subset of the first lidar data is associated with a semantic classification that is disallowed for validation.

6. The system of claim 1, wherein determining the sensor alignment error comprises determining at least one of a total median angle or median angular error based at least in part on median angles determined for a subset of the voxels including the first voxel.

7. One or more non-transitory computer-readable media storing processor-executable instructions that, when executed by one or more processors, cause one or more processors to perform operations comprising:

receiving a current sensor alignment of a first lidar device relative to a second lidar device;

receiving first lidar data from the first lidar device and second lidar data from the second lidar device;

associating the first lidar data and the second lidar data with voxels, wherein a first subset of the first lidar data is associated with a first voxel of the voxels and a second subset of the second lidar data is associated with the first voxel;

determining, for a first voxel of the voxels, a first geometric approximation associated with the first subset of the first lidar data;

determining, for the first voxel, a second geometric approximation associated with the second subset of the second lidar data;

determining, as a first error associated with the first voxel, a first distance between a first lidar point of the first subset and the second geometric approximation;

determining, as a second error associated with the first voxel, a second distance between a second lidar point of the second subset and the first geometric approximation; and based at least in part on a sensor alignment error that is based at least in part on the first error and the second error, either:

determining to output a validation of the current sensor alignment based at least in part on determining that the sensor alignment error is less than an error threshold, or determining to output an indication that the current sensor alignment is invalid based at least in part on determining that the sensor alignment error meets or exceeds the error threshold.

8. The one or more non-transitory computer-readable media of claim 7, wherein the operations further comprise determining a subset of voxels from among the voxels to include for validating the current sensor alignment, wherein the first voxel is determined to be included in the subset of voxels based at least in part on at least one of:

determining that the first geometric approximation and the second geometric approximation are associated with a same feature of an environment through which a vehicle is traversing, determining that a first planarity score determined for the first subset of the first lidar data indicates that the first subset is planar, determining that a number of lidar points in the first subset of the first lidar data meets or exceeds a threshold number of lidar points, or determining that the first subset of the first lidar data is associated with a determined semantic classification.

9. The one or more non-transitory computer-readable media of claim 8, wherein:

determining the first planarity score comprises at least one of:

determining a residual associated with fitting the first geometric approximation to the first subset of the first lidar data, determining a variance of position of lidar points in the first subset in a direction orthogonal to the first geometric approximation, or determining, by eigenvalue decomposition, eigenvalues associated with the first subset; and determining that the first subset is planar comprises:

determining that the residual is less than a threshold residual, determining that the variance is less than a threshold variance, or determining that the eigenvalues include two eigenvalues that are positive or meet or exceed a first threshold number and a third eigenvalue that is zero or less than a second threshold number.

10. The one or more non-transitory computer-readable media of claim 8, wherein:

the first voxel is determined based at least in part on determining to subdivide a second voxel larger than and containing the first voxel; and the operations further comprise:

determining a second planarity score associated with a third subset of the first lidar data associated with the second voxel; and determining that the second planarity score indicates that the third subset is non-planar, wherein determining to subdivide the second voxel is based at least in part on determining that the first second score indicates that the third subset is non-planar.

11. The one or more non-transitory computer-readable media of claim 7, wherein the operations further comprise determining a subset of voxels from among the voxels to include in a validation subset for validating the current sensor alignment, wherein:

determining the subset of voxels comprises excluding a second voxel from the subset of voxels based at least in part on one or more of:

determining that a third geometric approximation determined from a third subset of the first lidar data associated with the second voxel and a fourth geometric approximation determined from a fourth subset of the second lidar data associated with the second voxel are associated with different features in an environment through which a vehicle is traversing, determining that a planarity score determined for the third subset of the first lidar data indicates that the third subset is nonplanar, determining that a number of lidar points in the third subset of the first lidar data is less than a threshold number of lidar points, or determining that the third subset of the first lidar data is associated with a semantic classification that is disallowed for validation.

12. The one or more non-transitory computer-readable media of claim 7, wherein determining the sensor alignment error comprises determining at least one of a total median angle or median angular error based at least in part on median angles determined for a subset of the voxels including the first voxel.

13. The one or more non-transitory computer-readable media of claim 12, wherein determining at least one of the total median angle or the median angular error is based at least in part:

determining a first angle based at least in part on the first distance and a first distance from the first lidar device to the first voxel;

determining a second angle based at least in part on the second distance and a second distance from the second lidar device to the first voxel;

determining a first median angle based at least in part on the first angle and the second angle; and at least one of determining the total median angle based at least in part on the first median angle and other median angles associated with other voxels of the subset of the voxels or determining the median angular error based at least in part on a difference between the first median angle and the other median angles.

14. The one or more non-transitory computer-readable media of claim 7, wherein:

the operations comprise modifying the current sensor alignment as a modified sensor alignment based at least in part on determining the indication that the current sensor alignment is invalid; and modifying the current sensor alignment comprises altering at least one of a first position of the first lidar device, a first orientation of the first lidar device, a second position of the second lidar device, or a second orientation of the second lidar device to reduce to the sensor alignment error.

15. A method comprising:

receiving a current sensor alignment of a first lidar device relative to a second lidar device;

receiving first lidar data from the first lidar device and second lidar data from the second lidar device;

associating the first lidar data and the second lidar data with voxels, wherein a first subset of the first lidar data is associated with a first voxel of the voxels and a second subset of the second lidar data is associated with the first voxel;

determining, for a first voxel of the voxels, a first geometric approximation associated with the first subset of the first lidar data;

determining, for the first voxel, a second geometric approximation associated with the second subset of the second lidar data;

determining, as a first error associated with the first voxel, a first distance between a first lidar point of the first subset and the second geometric approximation;

determining, as a second error associated with the first voxel, a second distance between a second lidar point of the second subset and the first geometric approximation; and based at least in part on a sensor alignment error that is based at least in part on the first error and the second error, either:

determining to output a validation of the current sensor alignment based at least in part on determining that the sensor alignment error is less than an error threshold, or determining to output an indication that the current sensor alignment is invalid based at least in part on determining that the sensor alignment error meets or exceeds the error threshold.

16. The method of claim 15, wherein the method further comprises determining a subset of voxels from among the voxels to include for validating the current sensor alignment, wherein the first voxel is determined to be included in the subset of voxels based at least in part on at least one of:

determining that the first geometric approximation and the second geometric approximation are associated with a same feature of an environment through which a vehicle is traversing, determining that a first planarity score determined for the first subset of the first lidar data indicates that the first subset is planar, determining that a number of lidar points in the first subset of the first lidar data meets or exceeds a threshold number of lidar points, or determining that the first subset of the first lidar data is associated with a determined semantic classification.

17. The method of claim 16, wherein:

determining the first planarity score comprises at least one of:

determining a residual associated with fitting the first geometric approximation to the first subset of the first lidar data, determining a variance of position of lidar points in the first subset in a direction orthogonal to the first geometric approximation, or determining, by eigenvalue decomposition, eigenvalues associated with the first subset; and determining that the first subset is planar comprises:

determining that the residual is less than a threshold residual, determining that the variance is less than a threshold variance, or determining that the eigenvalues include two eigenvalues that are positive or meet or exceed a first threshold number and a third eigenvalue that is zero or less than a second threshold number.

18. The method of claim 15, wherein the method further comprises determining a subset of voxels from among the voxels to include in a validation subset for validating the current sensor alignment, wherein:

determining the subset of voxels comprises excluding a second voxel from the subset of voxels based at least in part on one or more of:

determining that a third geometric approximation determined from a third subset of the first lidar data associated with the second voxel and a fourth geometric approximation determined from a fourth subset of the second lidar data associated with the second voxel are associated with different features in an environment through which a vehicle is traversing, determining that a planarity score determined for the third subset of the first lidar data indicates that the third subset is nonplanar, determining that a number of lidar points in the third subset of the first lidar data is less than a threshold number of lidar points, or determining that the third subset of the first lidar data is associated with a semantic classification that is disallowed for validation.

19. The method of claim 15, wherein determining the sensor alignment error comprises determining at least one of a total median angle or median angular error based at least in part on median angles determined for a subset of the voxels including the first voxel.

20. The method of claim 19, wherein determining at least one of the total median angle or the median angular error is based at least in part:

determining a first angle based at least in part on the first distance and a first distance from the first lidar device to the first voxel;

determining a second angle based at least in part on the second distance and a second distance from the second lidar device to the first voxel;

determining a first median angle based at least in part on the first angle and the second angle; and at least one of determining the total median angle based at least in part on the first median angle and other median angles associated with other voxels of the subset of the voxels or determining the median angular error based at least in part on a difference between the first median angle and the other median angles.

* * * * *